US012755677B2

(12) United States Patent
Kim et al.

(10) Patent No.: US 12,755,677 B2
(45) Date of Patent: Oct. 6, 2026

(54) LEVEL SHIFTING DEVICE AND DISPLAY DEVICE INCLUDING THE SAME

(71) Applicant: LG Display Co., Ltd., Seoul (KR)

(72) Inventors: Jungjae Kim, Paju-si (KR); Sanguk Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/195,211

(22) Filed: Apr. 30, 2025

(65) Prior Publication Data

US 2026/0127998 A1 May 7, 2026

(30) Foreign Application Priority Data

Nov. 5, 2024 (KR) ........................ 10-2024-0155116

(51) Int. Cl.
*G09G 3/32* (2016.01)

(52) U.S. Cl.
CPC ....... *G09G 3/32* (2013.01); *G09G 2310/0267* (2013.01); *G09G 2310/0289* (2013.01)

(58) Field of Classification Search
None
See application file for complete search history.

(56) References Cited

U.S. PATENT DOCUMENTS

2014/0015818 A1* 1/2014 Cho ............... H03K 19/017509
327/333

FOREIGN PATENT DOCUMENTS

KR 10-2014-0008786 A 1/2014

* cited by examiner

*Primary Examiner* — Christopher J Kohlman
(74) *Attorney, Agent, or Firm* — Birch, Stewart, Kolasch & Birch, LLP

(57) ABSTRACT

A level shifting device and a display device including the same are discussed. The level shifting device in some examples can include a controller configured to output a switching signal based on a plurality of output selection signals input in parallel through each corresponding input pin, and a first switching unit including a plurality of first switching elements connected between an input terminal and output terminals of a level selection signal, respectively, and configured to be turned on in response to the switching signal.

18 Claims, 24 Drawing Sheets

LEVEL SHIFTING DEVICE AND DISPLAY DEVICE INCLUDING THE SAME

CROSS-REFERENCE TO RELATED APPLICATION

The present application claims priority to Korean Patent Application No. 10-2024-0155116, filed in the Republic of Korea on Nov. 5, 2024, the entire contents of which is hereby expressly incorporated by reference into the present application.

BACKGROUND

Technical Field

The present disclosure relates to a level shifting device and a display device including the same.

Discussion of the Related Art

A pixel of a display device includes a light emitting diode and a driving circuit configured to drive the light emitting diode. The light emitting diode can be selected variously according to the types of the display device; however, recently, an organic light emitting diode (OLED) having a fast response speed and excellent light emission efficiency, luminance, viewing angle, contrast range and color reproducibility is actively used.

The display device has a level shifting device configured to boost or drop a voltage level of signals applied to the display panel to have a desired voltage level. The level shifting device in general includes input pins which correspond to signals to be applied to the display panel, respectively, and is configured to boost or drop a voltage level of each of signals input through the input pins by using an independent level shifter. Such a level shifting device can boost or drop a voltage level of a signal at a fast speed. However, there is a limitation in that a quantity of the input pins increases and the entire size can grow greater because of many level shifters provided therein.

In order to reduce the quantity of the input pins and the level shifters, a manner of sequentially inputting a signal to one input pin and boosting or dropping a voltage level sequentially through one level shifter can be used. However, there can be a drawback in that a long waiting time is used for the signal processing.

SUMMARY OF THE DISCLOSURE

The embodiments of the present disclosure provide a level shifting device which reduces a quantity of the input pins, and in which the waiting time for signal processing is unnecessary or reduced, and provide a display device including the level shifting device.

The embodiments of the present disclosure provide a level shifting device which selects a signal of which a voltage level is to be transitioned using an output selection data input in parallel, and provide a display device including the level shifting device.

The embodiments of the present disclosure provide a level shifting device which selects a signal of which a voltage level is to be transitioned using output selection bits input in parallel and boosts or drops a signal of which a voltage level is to be transitioned using a level selection signal, and provide a display device including the level shifting device.

One or more embodiments of the present disclosure provide a level shifting device, including a controller configured to output a switching signal based on a plurality of output selection signals input in parallel through each corresponding input pin; and a first switching unit including a plurality of first switching elements connected between an input terminal and output terminals of a level selection signal, respectively, and configured to be turned on in response to the switching signal.

According to aspects of the present disclosure, the controller can output the switching signal in a turn-on level to one among the first switching elements based on the plurality of output selection signals, and the first switching elements can be turned on according to the switching signal, and output the level selection signal to a corresponding output terminal.

According to aspects of the present disclosure, the plurality of output selection signals can instruct each bit of a binary code which includes information with respect to an output signal of which a voltage level is to be transitioned among the output signals.

According to aspects of the present disclosure, the level shifting device can further include: a second switching unit including a plurality of second switching elements connected between the first switching elements and the output terminals thereof, respectively, and configured to be turned on in response to a latch signal.

According to aspects of the present disclosure, the second switching unit can further include first capacitors connected between one end of the second switching elements and a ground voltage, respectively; and second capacitors connected between another end of the second switching elements and the ground voltage, respectively.

According to aspects of the present disclosure, the controller can further receive the latch signal, and output the switching signal to a first switching element selected by the plurality of output selection signals among the first switching elements in response to the latch signal in a turn-on level.

According to aspects of the present disclosure, each of the second switching elements can output the level selection signal input through the first switching element corresponding thereto to a corresponding output terminal in response to the latch signal in the turn-on level.

According to aspects of the present disclosure, the first capacitors or the second capacitors can store a voltage corresponding to the level selection signal when the first switching element corresponding thereto or the second switching element corresponding thereto is turned on.

According to aspects of the present disclosure, a signal corresponding to the voltage stored in the second capacitors can be output to the output terminals when the second switching elements are turned off.

According to aspects of the present disclosure, the controller can further receive a pre-latch signal, and output the switching signal to a first switching element selected by the plurality of output selection signals among the first switching elements when the pre-latch signal is in a turn-on level.

According to aspects of the present disclosure, the first capacitors can store a voltage corresponding to the level selection signal when the first switching elements are turned on in response to the pre-latch signal while the latch signal is applied in a turn-off level.

According to aspects of the present disclosure, a signal corresponding to the voltage stored in the first capacitors can be output to the output terminal through the second switching elements when the latch signal is applied in a turn-on level.

Another embodiment of the present disclosure provides a display device, including: a display panel having an arrangement of pixels; a timing controller configured to control an operation timing of the display panel; a level shifting device configured to generate output signals based on a gate driving control signal applied from the timing controller and output the output signals to a corresponding output terminal; and a gate driver including a plurality of stage circuits connected to the output terminals of the level shifting device, respectively, and configured to apply a gate signal to the pixels in response to the output signal.

According to aspects of the present disclosure, the timing controller can generate a plurality of output selection signals by encoding information with respect to an output signal of which a voltage level is to be transitioned among the output signals in a binary code, and the level shifting device can include a controller configured to receive the plurality of output selection signals in parallel through each corresponding input pin and to generate the output signals based on the plurality of output selection signals.

According to aspects of the present disclosure, the controller can output a switching signal based on the plurality of output selection signals, where the level shifting device can further include: a first switching unit including a plurality of first switching elements connected between an input terminal and output terminals of a level selection signal, respectively, and configured to be turned on in response to the switching signal; and a second switching unit including a plurality of second switching elements connected between the first switching elements and the output terminals thereof, respectively, and configured to be turned on in response to a latch signal.

According to aspects of the present disclosure, the second switching unit can further include: first capacitors connected between one end of the second switching elements and a ground voltage, respectively; and second capacitors connected between another end of the second switching elements and the ground voltage, respectively.

According to aspects of the present disclosure, the controller can further receive the latch signal, and output the switching signal to one among the first switching elements in response to the latch signal in a turn-on level.

According to aspects of the present disclosure, each of the second switching elements can output the level selection signal input through the first switching element corresponding thereto to a corresponding output terminal in response to the latch signal in the turn-on level.

According to aspects of the present disclosure, the first capacitors or the second capacitors can store a voltage corresponding to the level selection signal when the first switching element corresponding thereto or the second switching element corresponding thereto is turned on.

According to aspects of the present disclosure, a signal corresponding to the voltage stored in the second capacitors can be output to the output terminals when the second switching elements are turned off.

According to aspects of the present disclosure, the controller can further receive a pre-latch signal, and output the switching signal to a first switching element selected by the plurality of output selection signals among the first switching elements when the pre-latch signal is in a turn-on level.

According to aspects of the present disclosure, the first capacitors can store a voltage corresponding to the level selection signal when the first switching elements are turned on in response to the pre-latch signal while the latch signal is applied in a turn-off level, and a signal corresponding to the voltage stored in the first capacitors can be output to the output terminal through the second switching elements when the latch signal is applied in a turn-on level.

According to aspects of the present disclosure, a level shifting device and a display device including the same can reduce a quantity of input pins and an area of the device by using a selection signal input in parallel and directly boosting or dropping a signal which will be transitioned through a level selection signal.

According to aspects of the present disclosure, a level shifting device and a display device including the same can improve a response speed of the device by reducing a waiting time of signal processing and can improve the image quality of a display panel which displays the image according to the processed signal.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
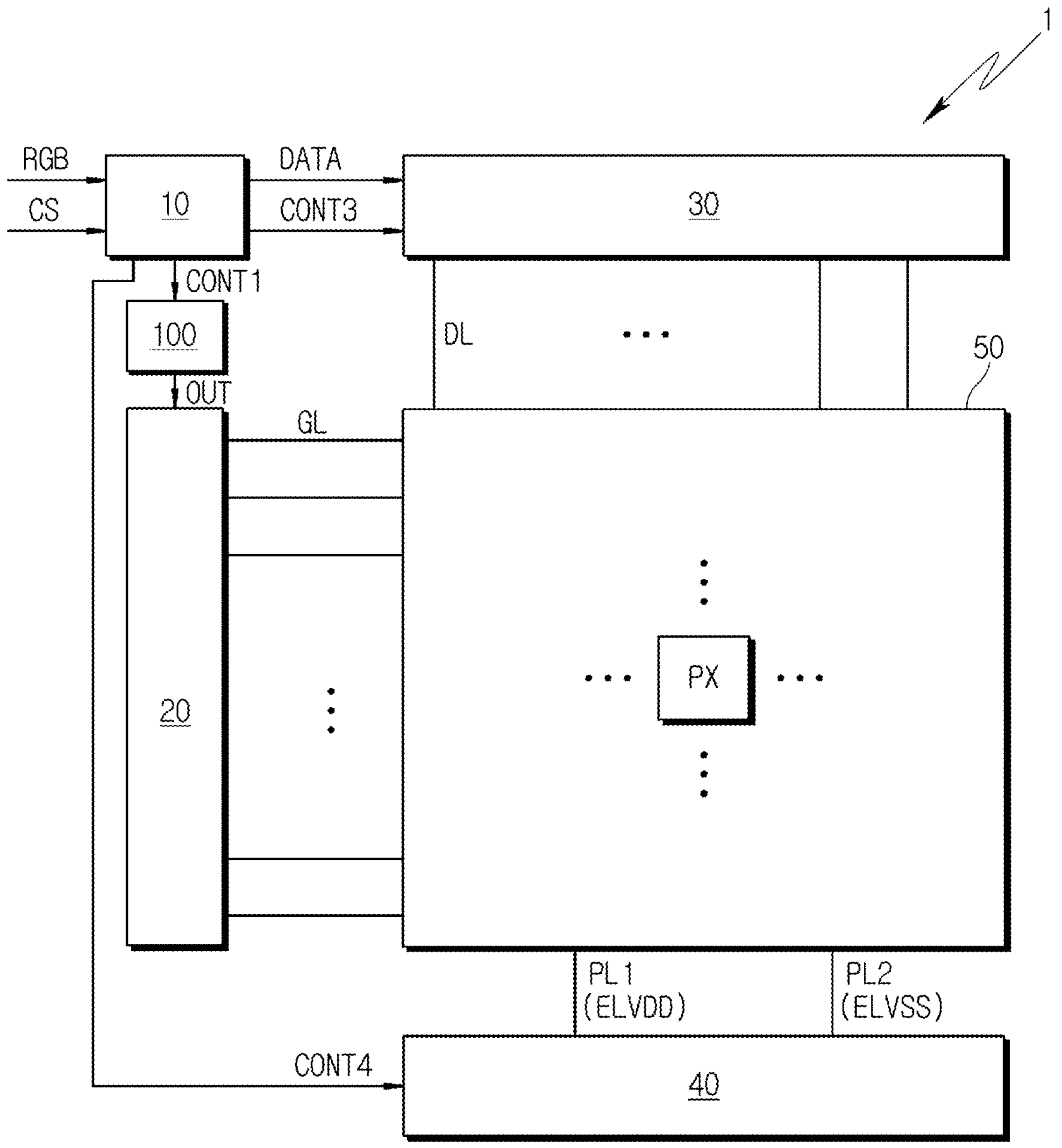
FIG. 1 is a block diagram illustrating a configuration of a display device according to one or more embodiments of the present disclosure.

Example embodiments of the present disclosure will now be described more fully with reference to the accompanying drawings. In this specification, when a component (or, an area, a layer, a part, etc.) is referred to as being "on", "connected to" or "combined to" another component, the component can be directly on, connected to, or combined to the other component, or a third component therebetween can be present.

Like reference numerals refer to like elements throughout. Additionally, in the drawings, the thicknesses, proportions, and dimensions of components can be exaggerated for ease of description and clarity. Further, "and/or" includes all of one or more combinations defined by related components.

It will be understood that when the terms "first" and "second" are used herein to describe various components, these components should not be limited by these terms. The above terms are used only to distinguish one component from another, and may not define order or sequence. For example, a first component can be referred to as a second component and vice versa without departing from the scope of the present disclosure. Singular expressions and terms used herein also encompass or include plural expressions and terms, unless the context clearly indicates otherwise.

In addition, terms such as "below", "the lower side", "on", and "the upper side" are used to describe relationships or configurations of elements shown in the drawing. Such terms are understood to provide relative descriptions based on one or more directions shown in the drawing.

In various embodiments of the present disclosure, the terms "include," "comprise," "including," or "comprising," can refer to a property, a region, a fixed number, a step, a process, an element and/or a component, but do not exclude other properties, regions, fixed numbers, steps, processes, elements and/or components.

Features of various embodiments of the present disclosure can be partially or entirely coupled to or combined with each other and can be operated, linked, or driven together in various ways. Embodiments of the present disclosure can be carried out independently from each other, or can be carried out together in co-dependent or related relationship.

Further, the term "can" encompasses all the meanings and coverages of the term "may" and vice versa.

All the components of each display device according to all embodiments of the present disclosure are operatively coupled and configured.

FIG. 1 is a block diagram illustrating a display device according to one or more embodiments of the present disclosure.

Referring to FIG. 1, a display device 1 includes a timing controller 10, a level shifting device 100, a gate driver 20, a data driver 30, a power supply unit 40, and a display panel 50.

The timing controller 10 can control an operation timing of the gate driver 20 and the data driver 30. The timing controller 10 can receive a video signal RGB and a control signal CS from an external host system and the like. The video signal RGB can include a plurality of grayscale data. The control signal CS can include, for example, a horizontal synchronization signal, a vertical synchronization signal and a main clock signal.

The timing controller 10 processes the video signal RGB and the control signal CS to be suitable to operational conditions of the display panel 50, and can generate and output image data DATA, a gate driving control signal CONTI, a data driving control signal CONT3, and a power supply control signal CONT4.

A level shifting device 100 can output an output signal OUT to the gate driver 20 based on the gate driving control signal CONTI input from the timing controller 10. The gate driving control signal CONTI can include, for example, a level selection data, a latch signal, a pre-latch signal, and the like, but is not limited thereto.

The gate driver 20 can generate gate signals based on the signals output from the level shifting device 100. The gate driver 20 can provide the generated gate signals to the pixels PX through a plurality of gate lines GL. In an embodiment of the present disclosure, one pixel PX can be configured to receive a plurality of gate signals having different waveforms. In such an embodiment of the present disclosure, the gate driver 20 can provide the plurality of gate signals to the pixels PX through the gate lines GL corresponding thereto, respectively.

The gate driver 20 can be configured in a Gate-In-Panel form in which the gate driver 20 is mounted on the display panel 50. The gate driver 20 can be disposed on one side of the display panel 50, or on both sides (for example, left and right sides) of the display panel 50 as illustrated. According to a driving method, a panel design manner, and the like, the gate driver 20 can be disposed on both sides (for example, left and right sides) of the display panel 50, or can be connected to two or more side surfaces among four side surfaces of the display panel 50.

The data driver 30 can generate data signals based on the data driving control signal CONT3 and image data DATA output from the timing controller 10. The data driver 30 can provide the generated data signals to the pixels PX through a plurality of data lines DL.

The power supply unit 40 can generate a high potential driving voltage ELVDD and a low potential driving voltage ELVSS to be provided to the display panel 50 based on the power supply control signal CONT4. The power supply unit 40 can provide the generated driving voltages ELVDD and ELVSS to the pixels PX through corresponding power lines PL1 and PL2.

On the display panel 50, a plurality of pixels PX (or referred to as sub-pixels) is disposed. The pixels PX can be disposed, for example, in a matrix form on the display panel 50. The pixels disposed in one pixel row are connected to the same gate line GL, and the pixels disposed in one pixel column are connected to the same data line DL. The pixels PX can emit light at luminance corresponding to a data signal and a gate signal supplied through the gate line GL and the data line DL.

In an embodiment of the present disclosure, each pixel PX can display one color among red, green and blue. In another embodiment of the present disclosure, each pixel PX can display one color among cyan, magenta and yellow. In various embodiments of the present disclosure, each pixel PX can display one color among red, green, blue and white.

Figure 2:
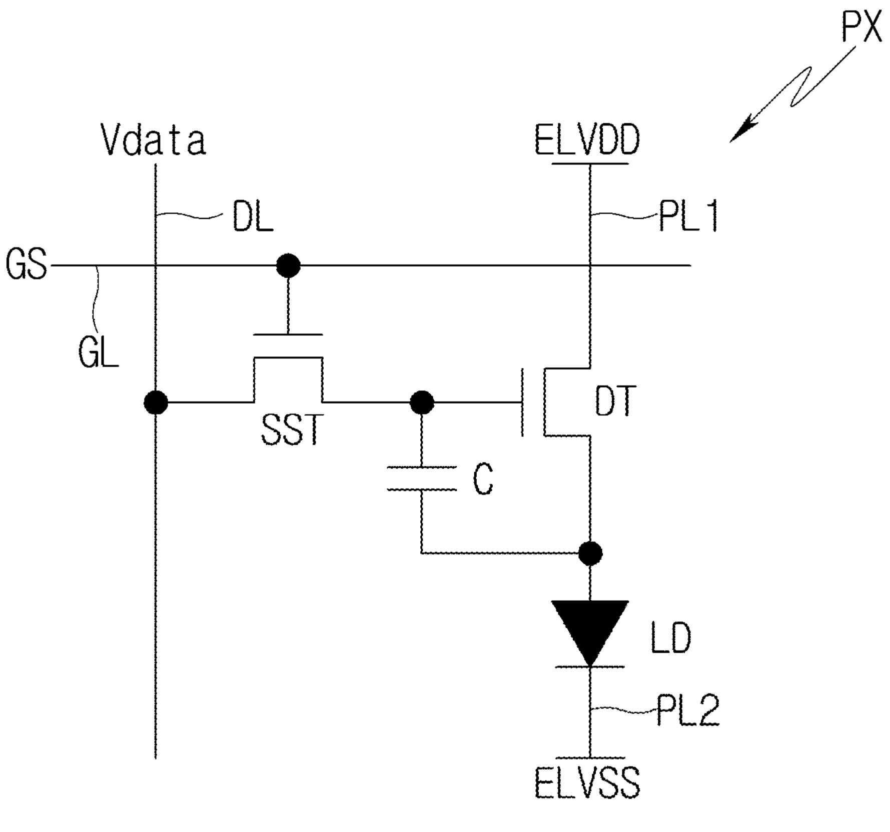
FIG. 2 is a circuit diagram of a pixel according to an embodiment of the present disclosure.

FIG. 2 is a circuit diagram of a pixel according to an embodiment of the present disclosure.

Referring to FIG. 2, the pixel PX according to an embodiment can include a light emitting diode LD, and a pixel circuit for regulating an amount of a current of the driving current applied to the light emitting diode LD. The pixel circuit can include, for example, a driving transistor DT, a switching transistor SST, and a capacitor C.

The driving transistor DT is connected between a first power line PL1 to which the high potential driving voltage ELVDD is applied and the light emitting diode LD. A gate electrode of the driving transistor DT is connected to the data line DL through the switching transistor SST. The driving transistor DT can be turned on in response to a data voltage Vdata applied to the gate electrode and can regulate an amount of the driving current flowing between the high potential driving voltage ELVDD and the light emitting diode LD.

The switching transistor SST is connected between a data line DL and the gate electrode of the driving transistor DT. A gate electrode of the switching transistor SST is connected to the gate line GL. The switching transistor SST can be turned on when a gate signal GS in a turn-on level is applied to the gate line GL, and can apply a data voltage Vdata applied to the data line DL to the gate electrode of the driving transistor DT.

In an embodiment of the present disclosure, the switching transistor SST can be configured as an n-type transistor. In such an embodiment, a turn-on level of the gate signal GS can be a high level, and a turn-off level thereof can be a low level. However, in another embodiment, the switching transistor SST can be configured as a p-type transistor. In such an embodiment, a turn-on level of the gate signal GS can be a low level, and a turn-off level thereof can be a high level.

The capacitor C can be connected between the gate electrode of the driving transistor DT and the light emitting diode LD. The capacitor C can store a voltage corresponding to a gate-source voltage of the driving transistor DT and can maintain the voltage during one frame.

The anode electrode of the light emitting diode LD can be connected to the driving transistor DT, and the cathode electrode thereof can be connected to a second power line PL2 to which a low potential driving voltage ELVSS is applied. When the driving transistor DT is turned on, a current path is formed between the high potential driving voltage ELVDD and the low potential driving voltage ELVSS, and a driving current can flow to the light emitting diode LD. The light emitting diode LD can emit light at luminance corresponding to an amount of the driving current applied thereto.

Figure 3:
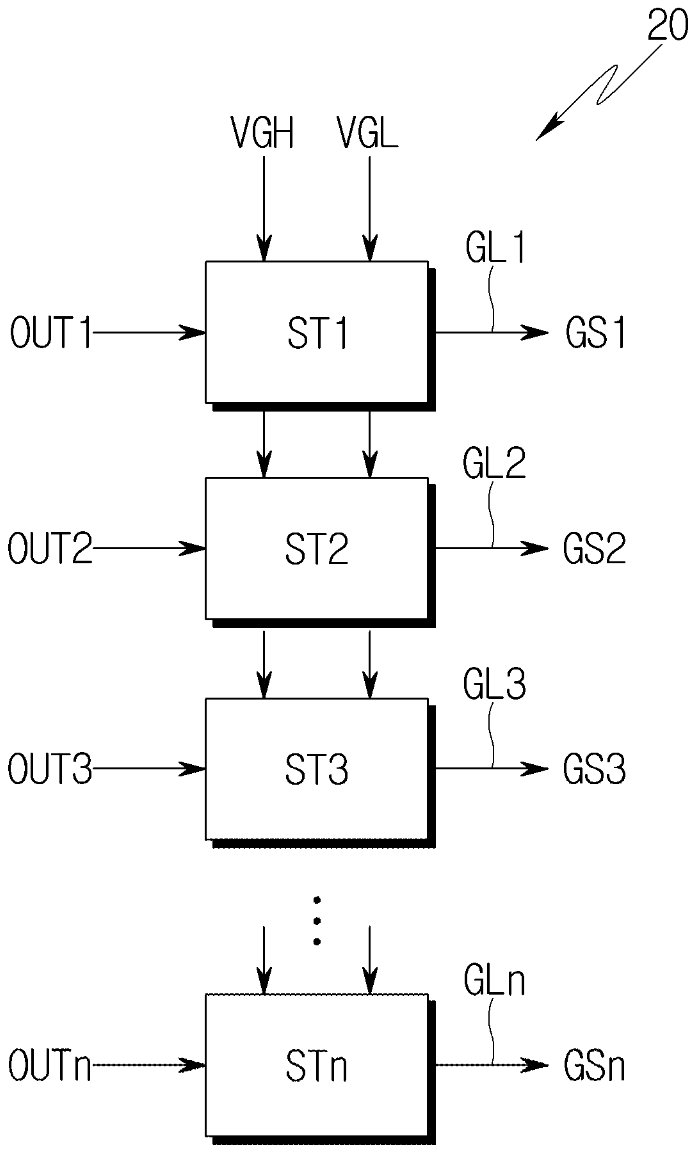
FIG. 3 is a block diagram illustrating a configuration of a gate driver according to an embodiment of the present disclosure.

FIG. 3 is a block diagram illustrating a configuration of the gate driver according to an embodiment of the present disclosure.

Referring to FIG. 3, the gate driver 20 can be configured with a plurality of stage circuits ST1 to STn, were n can be a real number such as a natural number or integer. Each of the stage circuits can be connected to the gate lines GL1 to GLn corresponding thereto, and can output a gate signal GS1 to GSn to the gate lines GL1 to GLn.

The stage circuits ST1 to STn can have substantially the same configuration.

The stage circuits ST1 to STn can be configured to receive an output signal OUT1 to OUTn applied from the level shifting device 100 (FIG. 1). For example, a first stage circuit ST1 can receive a first output signal OUT1 output from the level shifting device 100, a second stage circuit ST2 can receive a second output signal OUT2 output from the level shifting device 100, and an n-th stage circuit STn can receive an n-th output signal OUTn output from the level shifting device 100.

Each of the stage circuits ST1 to STn can be pulled up or pulled down by the output signal OUT1 to OUTn applied from the level shifting device 100, and can output one among a gate high voltage VGH and a gate low voltage VGL to the gate line GL1 to GLn as the gate signal GS1 to GSn.

When the pixel PX is configured with an n-type switching transistor SST, as illustrated in FIG. 2, the stage circuits ST1 to STn can output the gate signal GS1 to GSn in a high level based on the output signal OUT1 to OUTn and a carry signal output from a previous stage circuit. Reversely, when the pixel PX is configured with a p-type switching transistor SST, the stage circuits ST1 to STn can output the gate signal GS1 to GSn in a low level based on the output signal OUT1 to OUTn and a carry signal output from a previous stage circuit. However, the present embodiment is not limited thereto.

Figure 4:
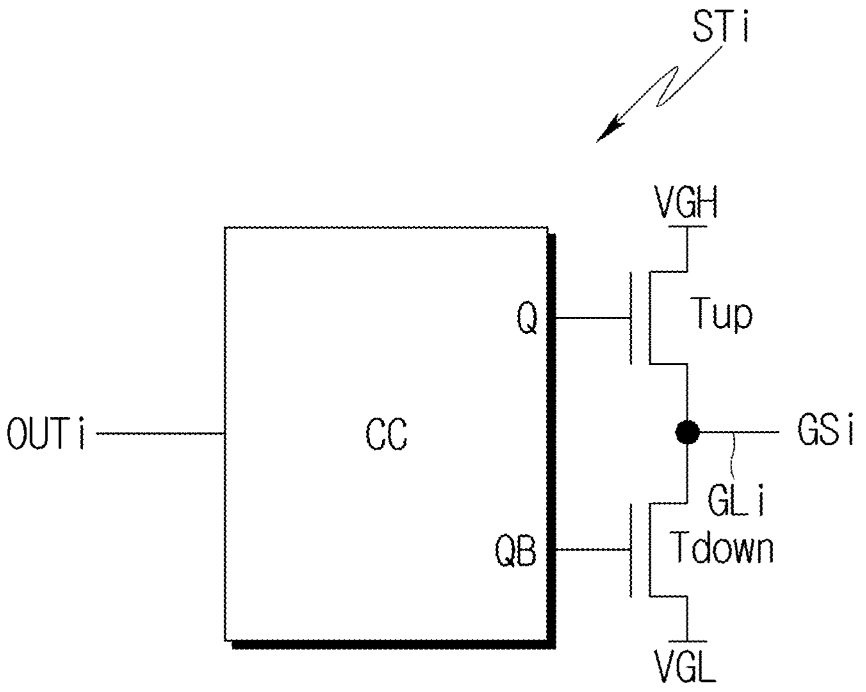
FIG. 4 is a diagram briefly illustrating an example of a stage circuit in FIG. 3.

FIG. 4 is a diagram briefly illustrating a stage circuit illustrated in FIG. 3. FIG. 4 shows an example of an i-th stage (i is a natural number between 1 and n) among the stage circuits ST1 to STn illustrated in FIG. 3.

Referring to FIG. 4, the stage circuit STi can include a control circuit unit CC of which an operation is controlled based on an i-th output signal OUTi applied from the level shifting device 100. The control circuit unit CC can include a Q node Q and a QB node QB, of which a voltage is controlled based on a voltage level of the i-th output signal OUTi. For example, when the i-th output signal OUTi is in a high level, the Q node can be charged to a high level and the QB node can be discharged to a low level. In addition, when the i-th output signal OUTi is in a low level, the Q node can be discharged to a low level, and the QB node can be charged to a high level.

The stage circuit STi can further include a pull-up transistor Tup configured to output a gate high voltage VGH in a high level to the gate line GLi in response to a voltage of the Q node, and a pull-down transistor Tdown configured to output a gate low voltage VGL in a low level in response to a voltage of the QB node.

The pull-up transistor Tup is connected between an input node of the gate high voltage VGH and the gate line GLi. A gate electrode of the pull-up transistor Tup is connected to the Q node. The pull-up transistor Tup can be turned on when the Q node is charged to a high level, and can output the gate high voltage VGH to the gate line GLi.

The pull-down transistor Tdown is connected between an input node of the gate low voltage VGL and the gate line GLi. A gate electrode of the pull-down transistor Tdown is connected to the QB node. The pull-down transistor Tdown can be turned on when the QB node is charged to a high level, and can output the gate low voltage VGL to the gate line GLi.

Figure 5:
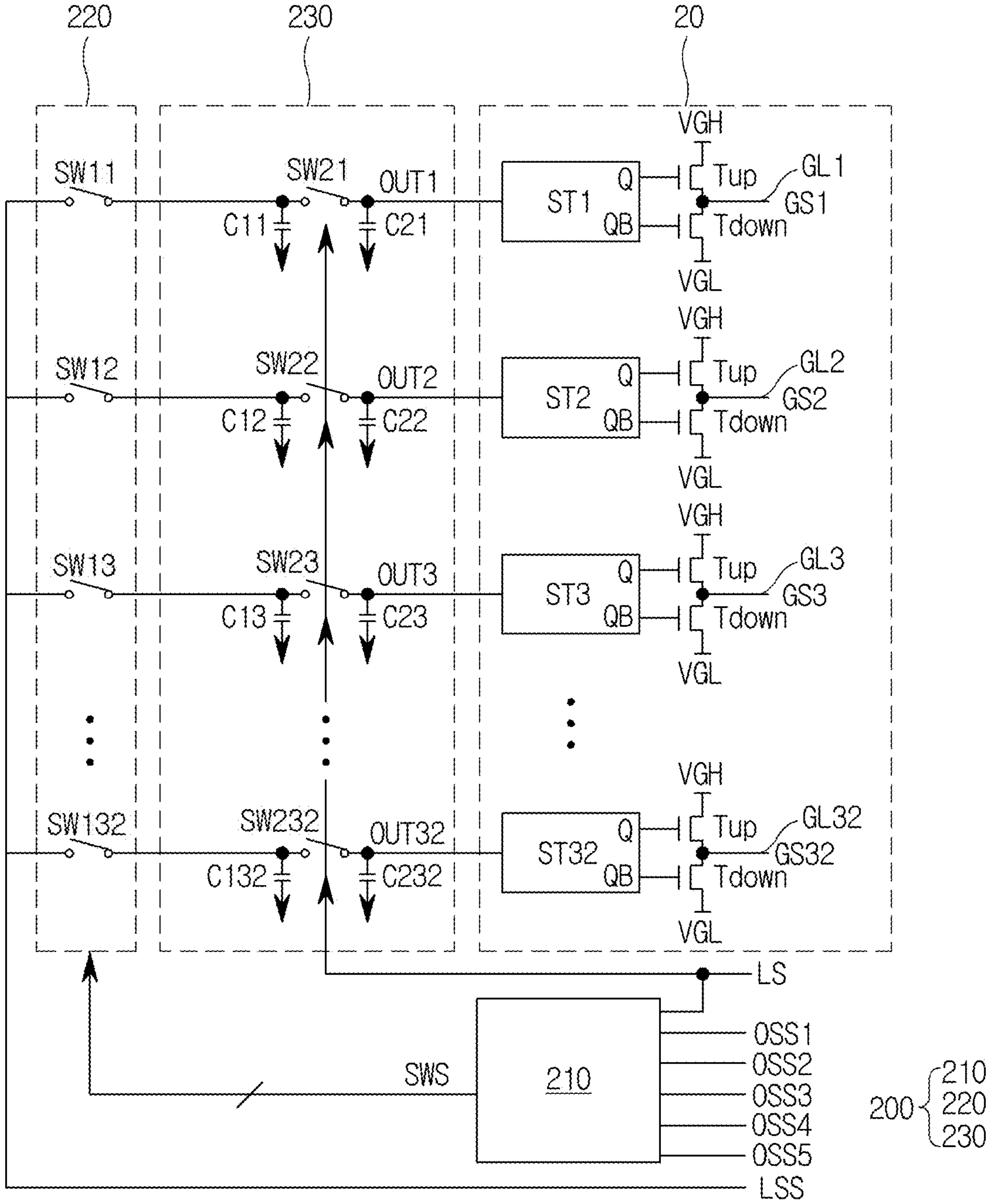
FIG. 5 is a diagram illustrating a structure of a level shifting device according to a first embodiment of the present disclosure.

FIG. 5 is a diagram illustrating a structure of a level shifting device according to a first embodiment of the present disclosure. In FIG. 5, an example in which the gate driver 20 includes thirty two stage circuits ST1 to ST32, and the level shifting device 200 outputs thirty two output signals OUT1 to OUT32 corresponding to the stage circuits is illustrated. However, a quantity of the stage circuits ST1 to ST32, a quantity of the output signals OUT1 to OUT32, and configurations of the level shifting device 200 and the gate driver 200 according to the quantities can be changed variously.

Referring to FIG. 5, the level shifting device 200 can include a controller 210, a first switching unit 220, and a second switching unit 230.

The controller 210 can receive the gate driving control signal CONTI (FIG. 1) from the timing controller 10 (FIG. 1). The gate driving control signal CONTI can include, for example, information of an output signal OUT1 to OUT32 of which a voltage level is to be transitioned among the plurality of output signals OUT1 to OUT32, for example, level selection data. The level selection data can be encoded into a binary code, and be converted into a plurality of output selection signals OSS1 to OSS5 corresponding to each bit. Each of the output selection signals OSS1 to OSS5 can be input to the controller 210 in parallel through an input pin corresponding to each of the signals.

The controller 210 can generate a switching signal SWS based on the plurality of output selection signals OSS1 to OSS5. The controller 210 can generate output signals OUT1 to OUT32 instructed by the plurality of output selection signals OSS1 to OSS5, and output a switching signal SWS in a turn-on level to a switching element SW11 to SW132 of the first switching unit 220 connected to an output terminal of the instructed output signal OUT1 to OUT32. For example, one among the switching elements SW11 to SW132 included in the switching unit 220 can be turned on based on the switching signal SWS. The switching signal SWS may not be applied to the switching elements SW11 to SW132 not instructed by the output signal OUT1 to OUT32, or the switching signal SWS in a turn-off level can be applied to the switching elements SW11 to SW132 not instructed by the output signal OUT1 to OUT32.

In an embodiment of the present disclosure, the controller 210 can further include a decoder configured to decode the output selection signals OSS1 to OSS5 in a digital format and supply them to each of the switching elements SW11 to SW132. For example, the controller 210 can include control channels configured to control each of the switching elements SW11 to SW132, and the switching signals SWS can be supplied to each of the channels.

In an embodiment of the present disclosure, the gate driving control signal CONTI can further include a latch signal LS. The latch signal LS is configured to control an output timing of the gate signals GS1 to GS32, and is applied to turn on or turn off the switching elements SW21 to SW232 of the second switching unit 230. For example, the latch signal LS can be provided simultaneously to the switching elements SW21 to SW232 of the second switching unit 230, and the switching elements SW21 to SW232 of the second switching unit 230 can be turned on or off simultaneously.

The controller 210 can control an output timing of the switching signal SWS in response to the latch signal LS. For example, the controller 210 can output the switching signal SWS to the first switching unit 220 while the latch signal LS is input in a turn-on level. In such a case, one among the switching elements SW11 to SW132 of the first switching unit 210 can be turned on.

The first switching unit 210 can include a plurality of switching elements SW11 to SW132. Each of the switching elements SW11 to SW132 is connected between an input terminal to which the level selection signal LSS is provided and the second switching unit 230. The plurality of switching elements SW11 to SW 132 can be controlled based on the switching signal SWS. One among the switching elements SW11 to SW132 can be turned on based on the switching signal SWS, and can provide the level selection signal LSS to the second switching unit 230.

When the input terminal of the level selection signal LSS and the second switching unit 230 are connected through the switching element SW11 to SW132 which is turned on, a level selection signal LSS in a high level or a low level can be output to the second switching unit 230.

The second switching unit 230 includes a plurality of switching elements SW21 to SW232. Each of the switching elements SW21 to SW232 is connected between the first switching unit 220 and an input terminal corresponding thereto. The plurality of switching elements SW21 to SW232 can be configured to receive the latch signal LS. Each of the switching elements SW21 to SW232 can be turned on in response to the latch signal LS.

The second switching unit 230 further includes first capacitors C11 to C132 connected to one end of each of the switching elements SW21 to SW232, and second capacitors C21 to C232 connected to another end thereof.

Each of the first capacitors C11 to C132 can be connected between one end of the switching element SW21 to SW232 corresponding thereto and a ground voltage. When the switching element SW11 to SW132 of the first switching unit 220 is turned on, the first capacitors C11 to C132 can store a voltage corresponding to a signal output through the first switching unit 220, for example, a voltage corresponding to the level selection signal LSS. By storing the voltage, the first capacitors C11 to C132 can maintain a voltage applied to the second switching unit 230 as a stored voltage while the switching element SW21 to SW232 of the first switching unit 220 is turned off.

Each of the second capacitors C21 to C232 can be connected between another end of the switching element SW21 to SW232 corresponding thereto and the ground voltage. When the switching element SW21 to SW232 of the second switching unit 230 is turned on, the second capacitors C21 to C232 can store a voltage corresponding to a signal output through the switching elements SW21 to SW232. By storing the voltage, the second capacitors C21 to C232 can maintain a voltage of the output terminal as a stored voltage while the switching element SW21 to SW232 of the second switching unit 230 is turned off.

When the second switching unit 230 is turned on, a voltage corresponding to the level selection signal LSS can be output to the output terminal. According to a voltage level of the level selection signal LSS, a voltage level of the output signal OUT1 to OUT32 output to the output terminal can be determined. When the level selection signal LSS is applied in a high level, the output signal OUT1 to OUT32 in a high level can be output through the switching element SW21 to SW232 of the first switching unit 220 which are turned on and the switching element SW21 to SW232 of the second switching unit 230 which are turned on. In addition, when the level selection signal LSS is applied in a low level, the output signal OUT1 to OUT32 in a low level can be output through the switching element SW21 to SW232 of the first switching unit 220 which are turned on and the switching element SW21 to SW232 of the second switching unit 230 which are turned on. A voltage of the Q node and/or the QB node of the stage circuit ST1 to ST32 of the gate driver 20 corresponding thereto can be controlled in response to a voltage level of the output signal OUT1 to OUT32.

The method for operating the level shifting device 200 will be described in more detail below.

Figure 6:
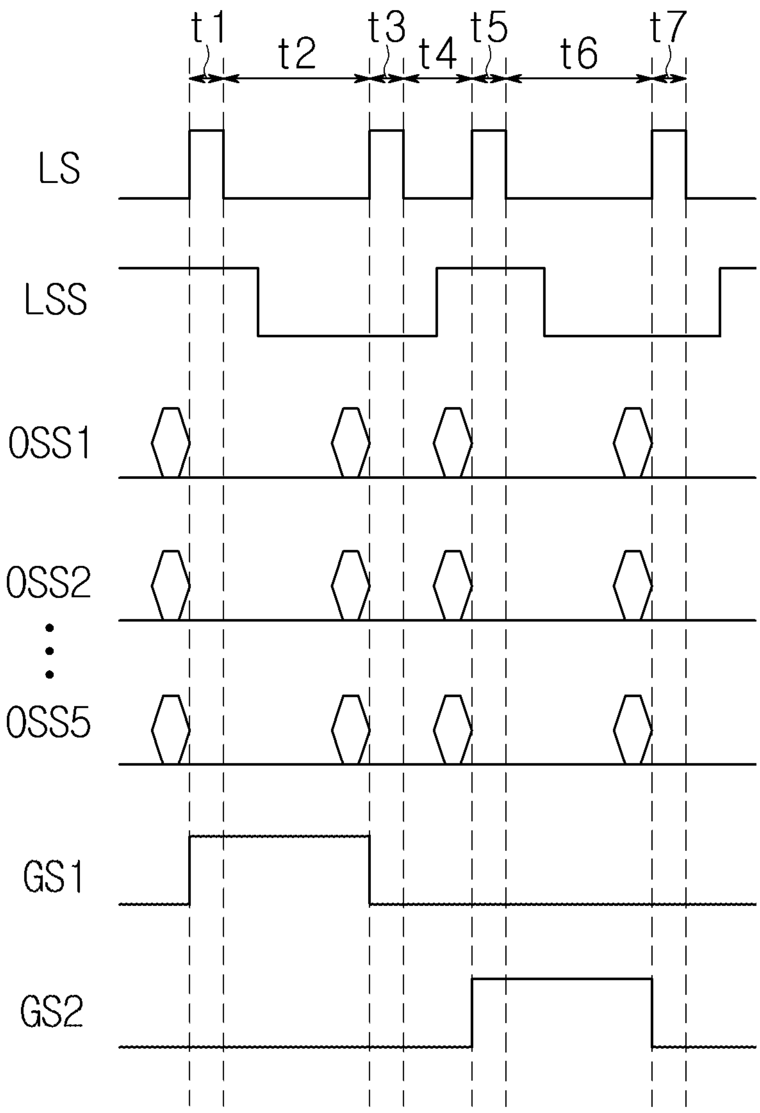
FIG. 6 is a diagram illustrating an input/output signal of the level shifting device in FIG. 5.

FIG. 6 is a diagram illustrating an input/output signal of the level shifting device illustrated in FIG. 5. FIGS. 7 to 13 are diagrams illustrating a method for operating the level shifting device illustrated in FIG. 5 according to aspects of the present disclosure.

Referring to FIG. 6, before a first period t1, the switching element SW11 to SW132 of the first switching unit 220 are operated in a turn-off state as illustrated in FIG. 5. In addition, the switching element SW21 to SW232 of the second switching unit 230 are operated in a turn-off state in response to the latch signal LS in a turn-off level.

In an embodiment of the present disclosure, before the first period t1, the output selection signals OSS1 to OSS5 having a "00000" value can be input. In addition, before the first period t1, the level selection signal LSS can be input in a high level. The "00000" value can be converted into a switching signal SWS for turning on the first switching element SW11. At this instance, the second to thirty second switching elements SW12 to SW132 can be turned off.

Figure 7:
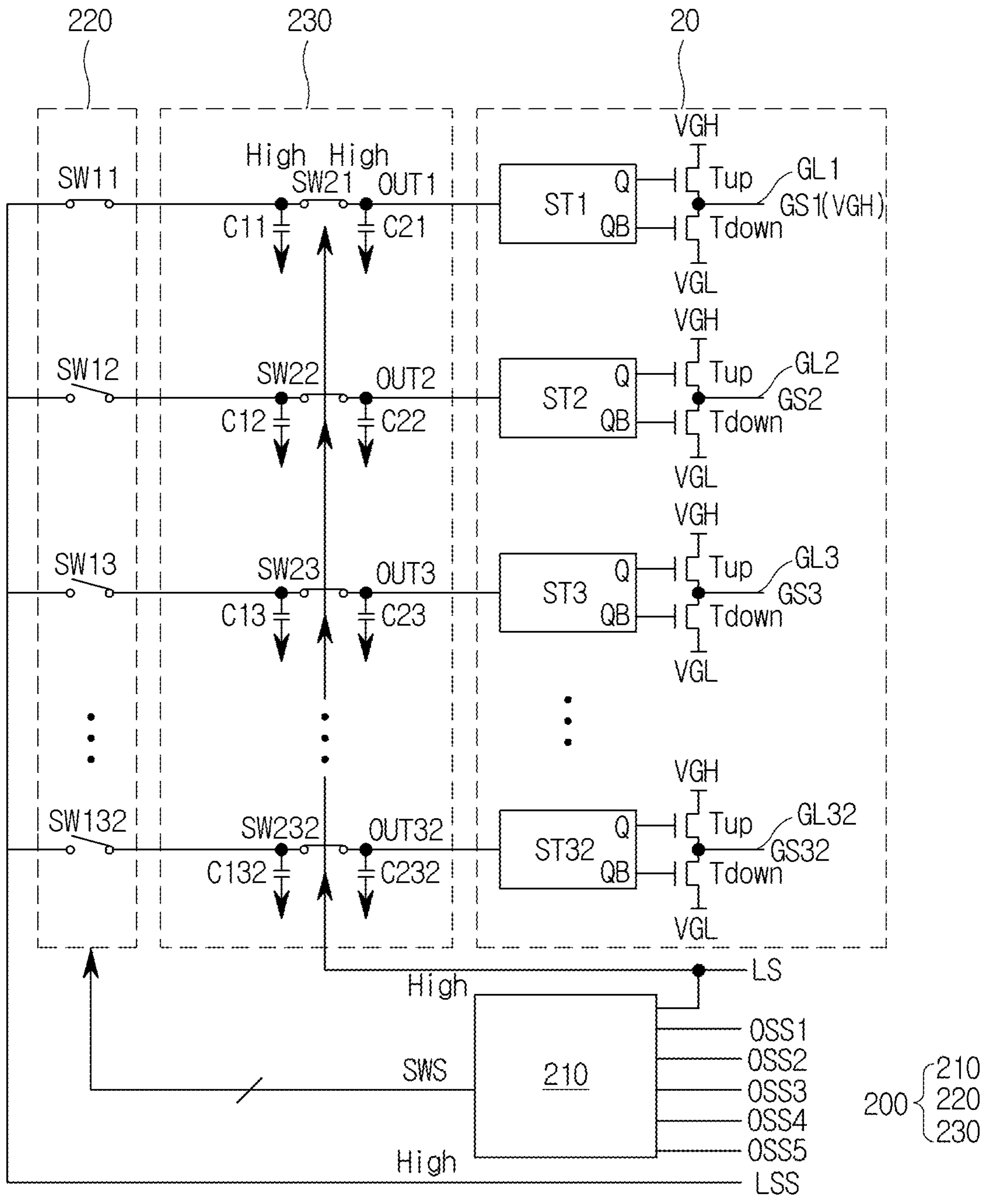
FIGS. 7 to 13 are diagrams illustrating a method for operating the level shifting device in FIG. 5 according to the first embodiment of the present disclosure.

Referring to FIG. 7, the latch signal LS can be applied in a turn-on level in the first period t1. Then, the switching element SW21 to SW232 of the second switching unit 230 can be turned on in response to the latch signal LS.

The controller 210 can output the switching signal SWS in response to the latch signal LS in a turn-on level. The controller 210 can apply the switching signal SWS in a turn-on level to the first switching element SW11 of the first switching unit 220 in response to the output selection signals OSS1 to OSS5. Then, the first switching element SW11 of the first switching unit 220 is turned on, and the level selection signal LSS in a high level can be applied to the second switching unit 230.

In the first period t1, the controller 210 can apply the switching signal SWS in a turn-off level to the second to thirty second switching elements SW12 to SW132 of the first switching unit 220.

The level selection signal LSS output from the first switching unit 220 can be further applied to the first stage circuit ST1 of the gate driver 20 through the first switching element SW21 of the second switching unit 230 which is turned on. A node voltage of the first stage circuit ST1 is controlled according to the level selection signal LSS in a high level, and a voltage level of a first gate signal GS1 output from the first stage circuit ST1 can be transitioned. For example, the first stage circuit ST1 can output the first gate signal GS1 in a turn-on level, for example, a high level. In the first period t1, the second to thirty second stage circuits ST2 to ST32 can output the gate signals GS2 to GS32 in a previous state, for example, the gate signals GS2 to GS32 in a turn-off level, which is a low level.

In an embodiment of the present disclosure, in the first period t1, a voltage in a high level corresponding to the level selection signal LSS can be stored in the first capacitor C11 and the second capacitor C21 connected to the first switching element SW21 of the second switching unit 230. In addition, in the first period t1, a voltage in a low level can be stored in the first capacitors C12 to C132 to the second capacitors C22 to C232 connected to the second to thirty second switching elements SW22 to SW232, respectively.

Figure 8:
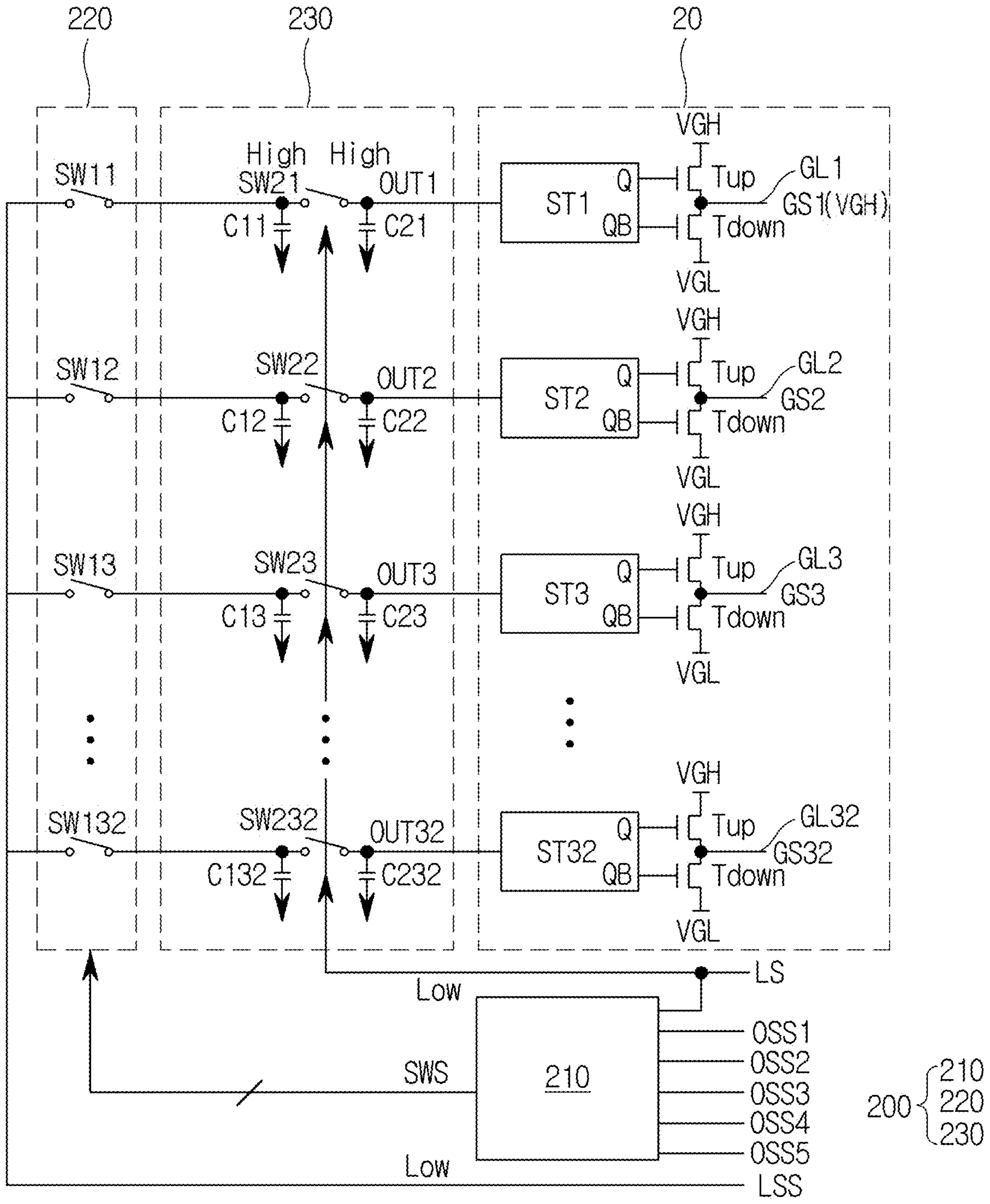

Referring to FIGS. 7 and 8 together, in the second period t2, the latch signal LS can be applied in a turn-off level. Then, the switching elements SW21 to SW232 of the second switching unit 230 can be turned off in response to the latch signal LS.

The controller 210 can apply the switching signal SWS in a turn-off level to the first switching element SW11 of the first switching unit 220 in response to the latch signal LS in a turn-off level, and the first switching element SW11 of the first switching unit 220 can be turned off.

In the second period t2, both the first switching unit 220 and the second switching unit 230 are turned off, however, the voltage of the output terminal can be maintained stably in a previously set level by the voltage (for example, a high level voltage) stored in the first capacitor C11 to C132 and the second capacitor C21 to C232. Therefore, in the second period t2, the first gate signal GS1 output from the first stage circuit ST1 can be maintained in a high level.

Meanwhile, in the second period t2, the output selection signals OSS1 to OSS5 having the "00000" value can be input again and the level selection signal LSS can be transitioned into a low level.

Figure 9:
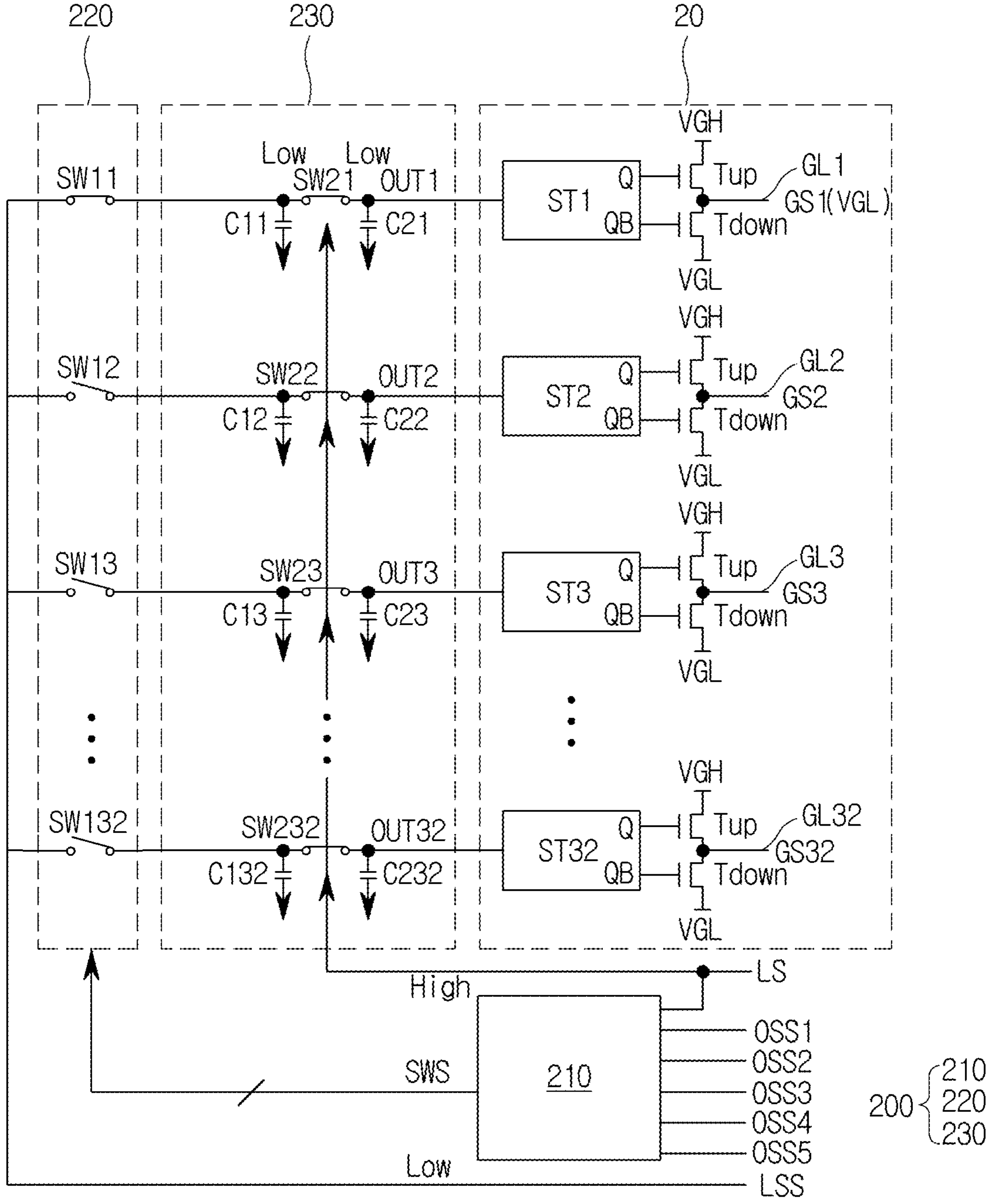

Referring to FIG. 9, in a third period t3, the latch signal LS can be applied in a turn-on level. Then, in response to the latch signal LS, the switching elements SW21 to SW232 of the second switching unit 230 can be turned on.

The controller 210 can output the switching signal SWS of which the "00000" value of the output selection signals OSS1 to OSS5 is converted in response to the latch signal LS in a turn-on level. Accordingly, the first switching element SW11 of the first switching unit 220 can be turned on. Then, as the first switching element SW11 of the first switching unit 220 is turned on, the level selection signal LSS in a low level can be applied to the second switching unit 230.

The level selection signal LSS can be further applied to the first stage circuit ST1 of the gate driver 20 through the first switching element SW21 of the second switching unit 230 which is turned on. For example, the first output signal OUT1 can have a low level. The node voltage of the first stage circuit ST1 can be controlled according to the level selection signal LSS in a low level, and a voltage level of the first gate signal GS1 output from the first stage circuit ST1 can be transitioned into a low level. As a result, the first stage circuit ST1 can output the first gate signal GS1 in a turn-off level, for example, a low level.

Meanwhile, in the third period t3, a low level voltage corresponding to the level selection signal LSS can be stored in the first capacitor C11 and the second capacitor C21 connected to the first switching element SW21 of the second switching unit 230. The second to the thirty second switching elements SW12 to SW132 of the first switching unit 220 maintain a turn-off state, and thus, the second to the thirty second output signals OUT2 to OUT32 can maintain a low level.

Figure 10:
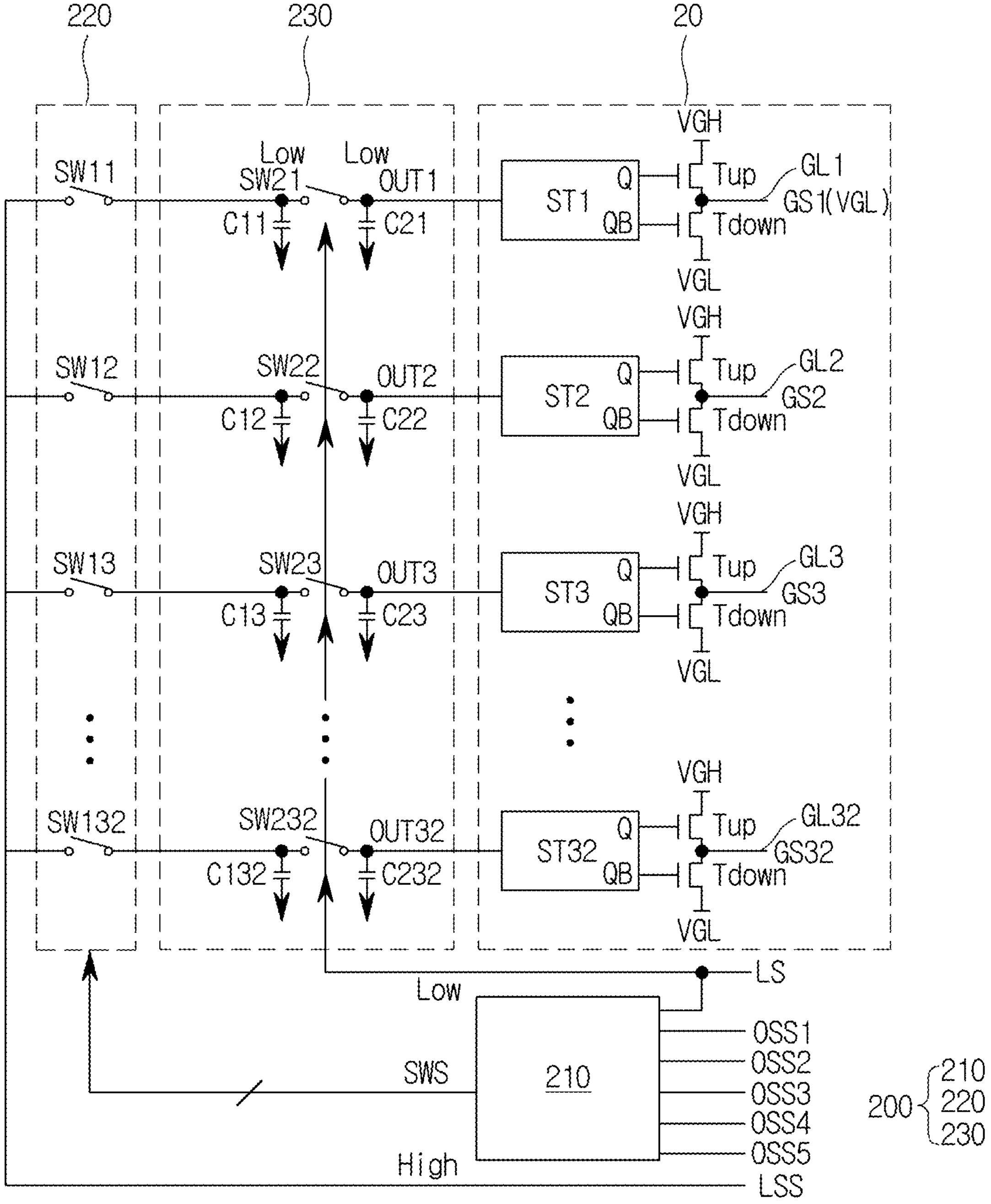

Referring to FIG. 10, in a fourth period t4, the latch signal LS can be applied in a turn-off level. Then, in response to the latch signal LS, the switching elements SW21 to SW232 of the second switching unit 230 can be turned off.

The controller 210 can apply the switching signal SWS in a turn-off level to the first switching element SW11 of the first switching unit 220 in response to the latch signal LS in a turn-off level. The first switching element SW11 of the first switching unit 220 can be turned off. In an embodiment, the controller 210 can apply the switching signal SWS in a turn-off level to the entire switching elements SW11 to SW132 of the first switching unit 220 in response to the latch signal LS in a turn-off level.

In the fourth period t4, both the first switching unit 220 and the second switching unit 230 are turned off, however, the voltage of the output terminal can be maintained stably in a previously set level by the voltage stored in the first capacitor C11 to C132 and the second capacitor C21 to C232. Therefore, in the fourth period t4, the first gate signal GS1 output from the first stage circuit ST1 can be maintained in a low level.

Meanwhile, in the fourth period t4, the output selection signals OSS1 to OSS5 having a "00001" value can be input and the level selection signal LSS can be transitioned into a high level.

Figure 11:
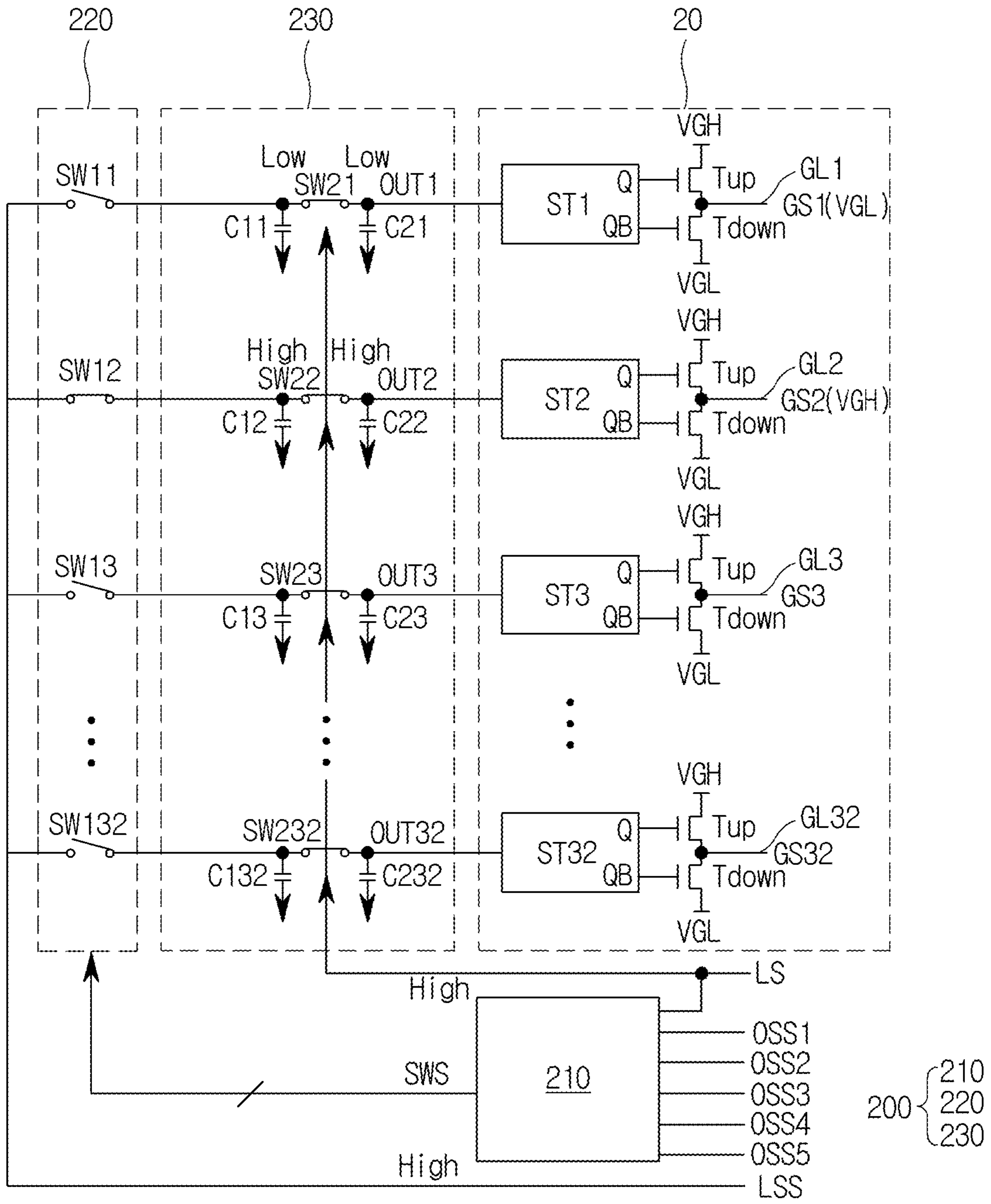

Referring to FIG. 11, in a fifth period t5, the latch signal LS can be applied in a turn-on level. Then, in response to the latch signal LS, the switching elements SW21 to SW232 of the second switching unit 230 can be turned on.

The controller 210 can output the switching signal SWS based on the output selection signals OSS1 to OSS5 and the latch signal LS in a turn-on level. For example, in response to the output selection signals OSS1 to OSS5, the controller 210 can apply the switching signal SWS in a turn-on level to the second switching element SW12 of the first switching unit 220. Then, as the second switching element SW12 of the first switching unit 220 is turned on, the level selection signal LSS in a high level can be applied to the second switching unit 230.

Meanwhile, in the fifth period t5, the switching signal SWS in a turn-off level can be applied to the first, and third to thirty second switching elements SW11, and SW13 to SW132 of the first switching unit 220.

The level selection signal LSS in a high level output from the first switching unit 220 can be further applied to the second stage circuit ST2 of the gate driver 20 through the second switching element SW22 of the second switching unit 230 which is turned on. A node voltage of the second stage circuit ST2 is controlled according to the level selection signal LSS in a high level, and a voltage level of a second gate signal GS2 output from the second stage circuit ST2 can be transitioned. For example, the second stage circuit ST2 can output the second gate signal GS2 in a turn-on level, for example, a high level. In the fifth period t5, the first and the third to thirty second stage circuits ST1 and ST3 to ST32 can output the gate signals GS1 and GS3 to GS32 in a previous state, for example, the gate signals GS1 and GS3 to GS32 in a turn-off level, which is a low level.

Meanwhile, in the fifth period t5, a high level voltage corresponding to the level selection signal LSS can be stored in the first capacitor C12 and the second capacitor C22 connected to the second switching element SW22 of the second switching unit 230.

Figure 12:
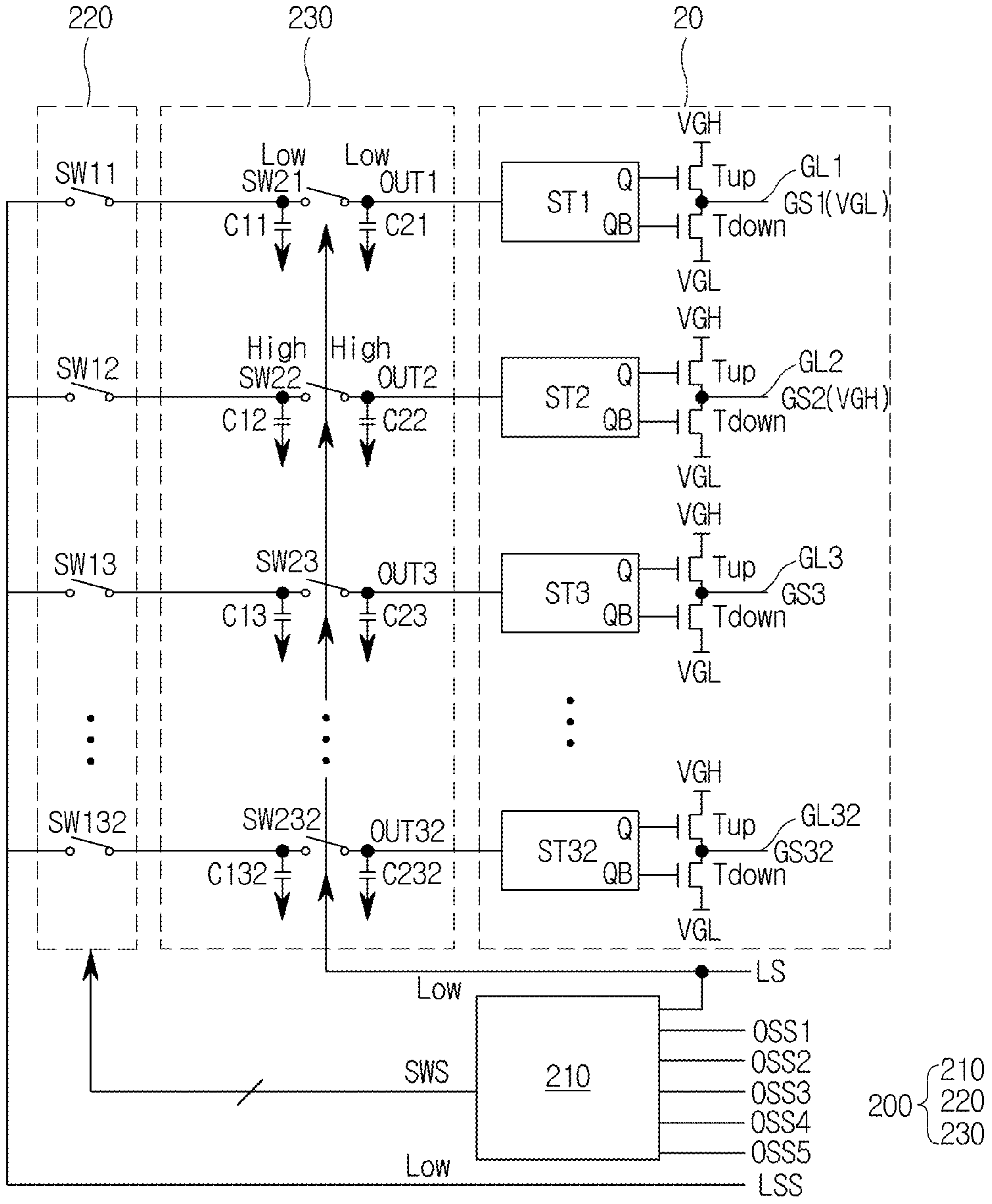

Referring to FIG. 12, in a sixth period t6, the latch signal LS can be applied in a turn-off level. Then, in response to the latch signal LS, the switching elements SW21 to SW232 of the second switching unit 230 can be turned off.

The controller 210 can apply the switching signal SWS in a turn-off level to the second switching element SW12 of the first switching unit 220 in response to the latch signal LS which is turned off, and the second switching element SW12 of the first switching unit 220 can be turned off.

In the sixth period t6, both the first switching unit 220 and the second switching unit 230 are turned off, however, the voltage of the output terminal can be maintained stably in a previously set level by the voltage stored in the first capacitor C11 to C132 and the second capacitor C21 to C232. Therefore, in the sixth period t6, the second gate signal GS2 output from the second stage circuit ST2 can be maintained in a high level.

Meanwhile, in the sixth period t6, the output selection signals OSS1 to OSS5 having a "00010" value can be input and the level selection signal LSS can be transitioned into a low level.

Figure 13:
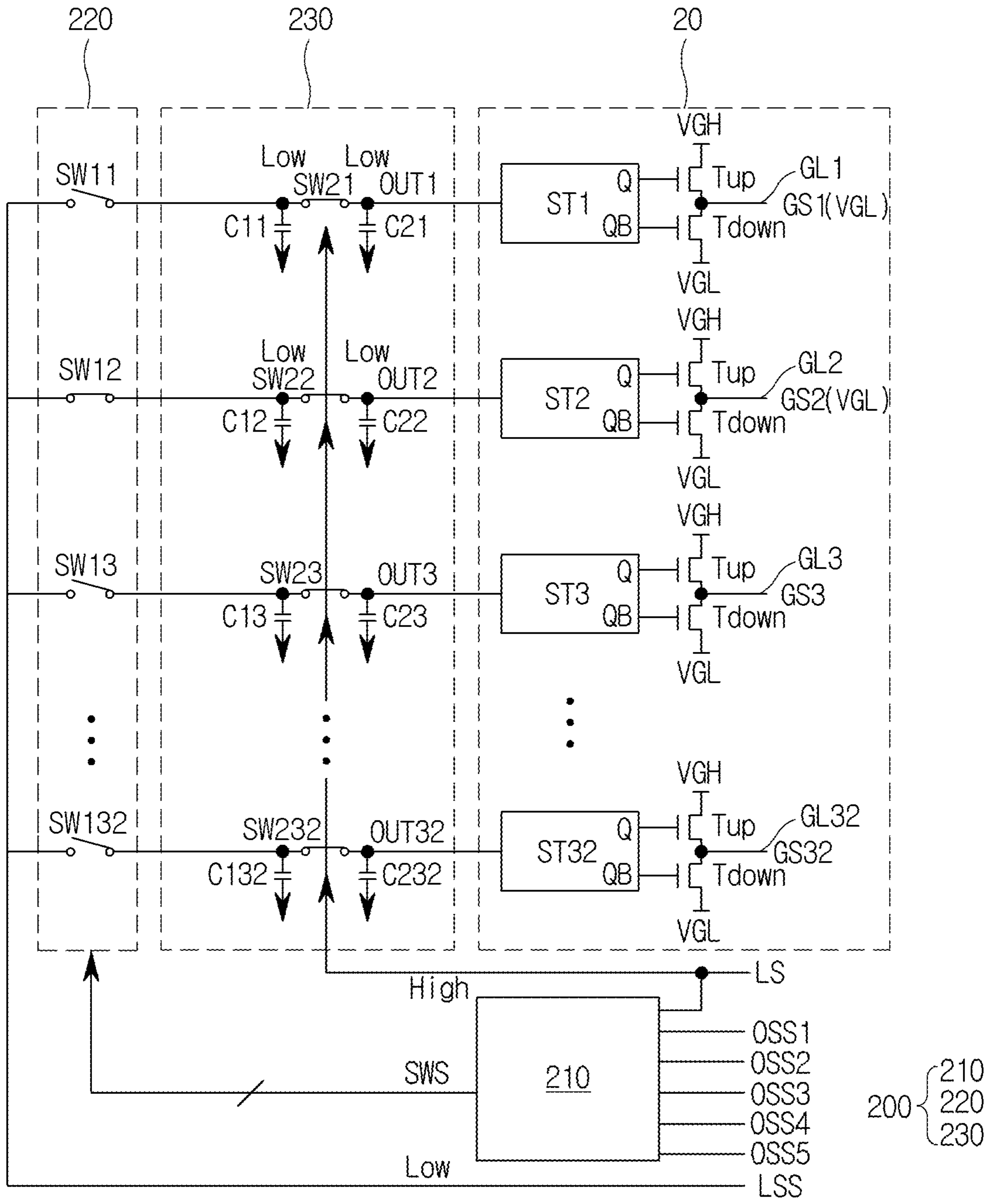

Referring to FIG. 13, in a seventh period t7, the latch signal LS can be applied in a turn-on level. Then, in response to the latch signal LS, the switching elements SW21 to SW232 of the second switching unit 230 can be turned on.

The controller 210 can output the switching signal SWS in response to the latch signal LS in a turn-on level. In response to the output selection signals OSS1 to OSS5, the controller 210 can apply the switching signal SWS in a turn-on level to the second switching element SW12 of the first switching unit 220. Then, as the second switching element SW12 of the first switching unit 220 is turned on, the level selection signal LSS in a low level can be applied to the second switching unit 230.

The level selection signal LSS can be further applied to the second stage circuit ST2 of the gate driver 20 through the second switching element SW22 of the second switching unit 230 which is turned on. The node voltage of the second stage circuit ST2 is controlled according to the level selection signal LSS in a low level, and the voltage level of the second gate signal GS2 output from the second stage circuit ST2 can be transitioned. As a result, the second stage circuit ST2 can output the second gate signal GS2 in a turn-off level, for example, a low level.

In such a manner, the level shifting device 200 can output the output signals OUT1 to OUT32, each of which is sequentially transitioned into a high level. The gate driver 20 can output the gate signals GS1 to GS32 which are sequentially turned on in response to the output signals OUT1 to OUT32 sequentially transitioned, to the gate lines GL1 to GL32.

Figure 14:
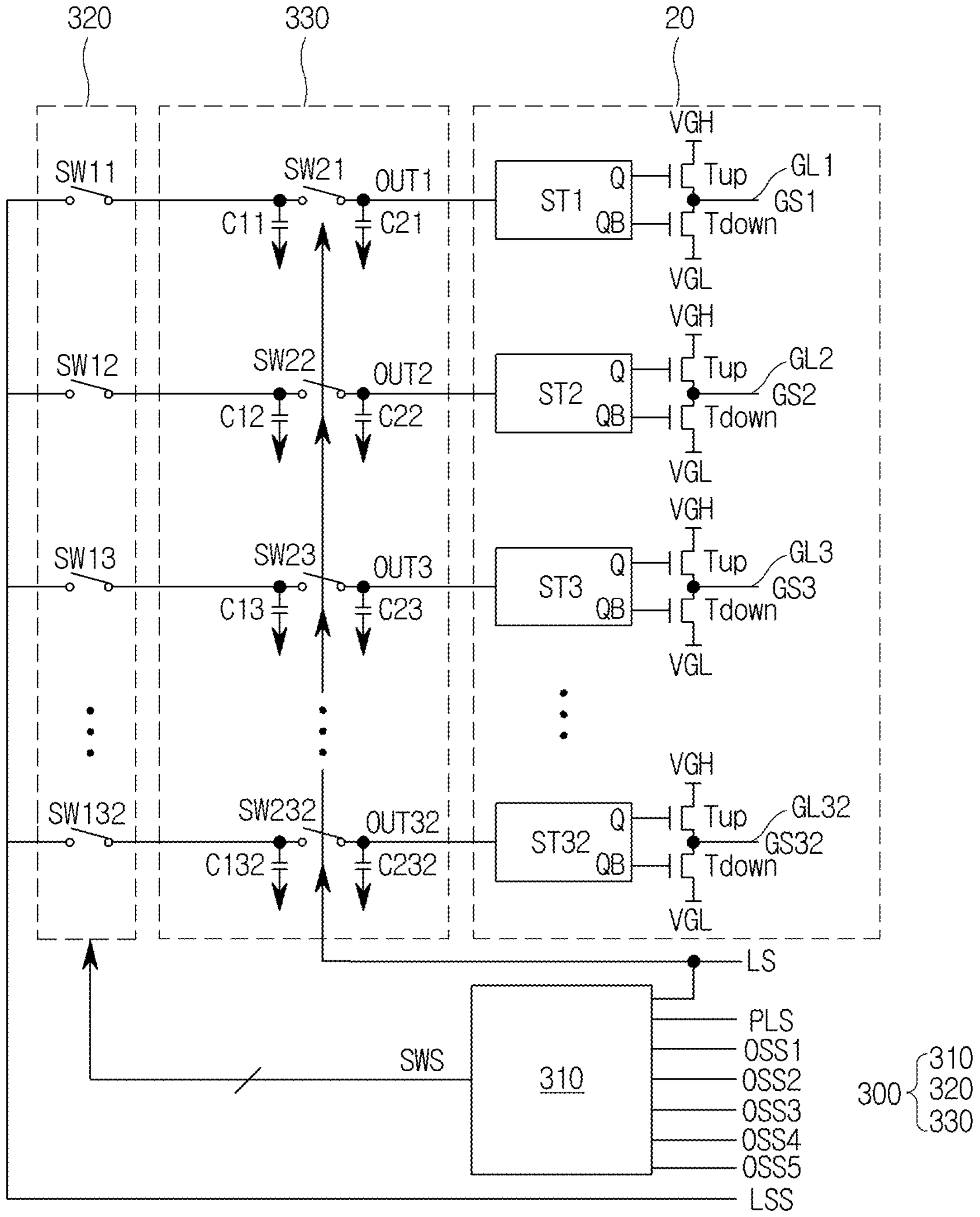
FIG. 14 is a diagram illustrating a structure of a level shifting device according to a second embodiment of the present disclosure.

FIG. 14 is a diagram illustrating a structure of a level shifting device according to a second embodiment of the present disclosure. In FIG. 14, an example in which the gate driver 20 includes thirty two stage circuits ST1 to ST32, and a level shifting device 300 outputs thirty two output signals OUT1 to OUT32 corresponding thereto is illustrated. However, a quantity of the stage circuits ST1 to ST32, a quantity of the output signals OUT1 to OUT32, and configurations of the level shifting device 300 and the gate driver 20 according to the quantities can be changed variously.

Referring to FIG. 14, the level shifting device 300 can include a controller 310, a first switching unit 320, and a second switching unit 330.

The controller 310 can receive the gate driving control signal CONTI (FIG. 1) from the timing controller 10 (FIG. 1). The gate driving control signal CONTI can include, for example, information of an output signal OUT1 to OUT32 of which a voltage level is to be transitioned among the plurality of output signals OUT1 to OUT32, for example, level selection data. The level selection data can be encoded into a binary code, and be converted into a plurality of output selection signals OSS1 to OSS5 corresponding to each bit. Each of the output selection signals OSS1 to OSS5 can be input to the controller 310 in parallel through an input pin corresponding to each of the signals.

The controller 310 can generate a switching signal SWS based on the plurality of output selection signals OSS1 to OSS5. The controller 310 can generate output signals OUT1 to OUT32 instructed by the plurality of output selection signals OSS1 to OSS5, and output a switching signal SWS in a turn-on level to a switching element SW11 to SW132 of the first switching unit 320 connected to an output terminal of the instructed output signal OUT1 to OUT32. For example, one among the switching elements SW11 to SW132 included in the switching unit 320 can be turned on based on the switching signal SWS. The switching signal SWS may not be applied to the switching elements SW11 to SW132 not instructed by the output signal OUT1 to OUT32, or the switching signal SWS in a turn-off level can be applied to the switching elements SW11 to SW132 not instructed by the output signal OUT1 to OUT32.

In an embodiment of the present disclosure, the controller 310 can further include a decoder configured to decode the output selection signals OSS1 to OSS5 in a digital format and supply them to each of the switching elements SW11 to SW132. For example, the controller 310 can include control channels configured to control each of the switching elements SW11 to SW132, and the switching signals SWS can be supplied to each of the channels.

In an embodiment of the present disclosure, the gate driving control signal CONTI can further include a latch signal LS. The latch signal LS is configured to control an output timing of the gate signals GS1 to GS32, and is applied to turn on or turn off the switching elements SW21 to SW232 of the second switching unit 330. For example, the latch signal LS can be provided simultaneously to the switching elements SW21 to SW232 of the second switching unit 330, and the switching elements SW21 to SW232 of the second switching unit 330 can be turned on or off simultaneously.

The controller 310 can control an output timing of the switching signal SWS in response to the latch signal LS. For example, the controller 310 can output the switching signal SWS to the first switching unit 320 while the latch signal LS is input in a turn-on level. In such a case, one among the switching elements SW11 to SW132 of the first switching unit 320 can be turned on.

In an embodiment of the present disclosure, the gate driving control signal CONTI can further include a pre-latch signal PLS. The pre-latch signal PLS can control an output timing of the switching signal SWS. For example, the controller 310 can output the switching signal SWS to the instructed switching element SW11 to SW132 of the first switching unit 320, while the latch signal LS is input in a turn-off level.

The first switching unit 320 includes a plurality of switching elements SW11 to SW132. Each of the switching elements SW11 to SW132 is connected between an input terminal to which the level selection signal LSS is provided and the second switching unit 330. The plurality of switching elements SW11 to SW132 can be controlled based on the switching signal SWS. One among the switching elements SW11 to SW132 can be turned on based on the switching signal SWS, and can provide the level selection signal LSS to the second switching unit 330. When the input terminal of the level selection signal LSS and the second switching unit 330 are connected through the switching element SW11 to SW132 which is turned on, a level selection signal LSS in a high level or a low level can be output to the second switching unit 330.

The second switching unit 330 includes a plurality of switching elements SW21 to SW232. Each of the switching elements SW21 to SW232 is connected between the first switching unit 320 and an input terminal corresponding thereto. The plurality of switching elements SW21 to SW232 can be configured to receive the latch signal LS. Each of the switching elements SW21 to SW232 can be turned on in response to the latch signal LS.

The second switching unit 330 further includes first capacitors C11 to C132 connected to one end of each of the switching elements SW21 to SW232, and second capacitors C21 to C232 connected to another end thereof.

Each of the first capacitors C11 to C132 can be connected between one end of the switching element SW21 to SW232 corresponding thereto and a ground voltage. When the switching element SW11 to SW132 of the first switching unit 320 is turned on, the first capacitors C11 to C132 can store a voltage corresponding to a signal output through the first switching unit 320, for example, a voltage corresponding to the level selection signal LSS. By storing the voltage, the first capacitors C11 to C132 can maintain a voltage applied to the second switching unit 330 as a stored voltage while the switching element SW21 to SW232 of the first switching unit 320 is turned off.

Each of the second capacitors C21 to C232 can be connected between another end of the switching element SW21 to SW232 corresponding thereto and the ground voltage. When the switching element SW21 to SW232 of the second switching unit 330 is turned on, the second capacitors C21 to C232 can store a voltage corresponding to a signal output through the switching elements SW21 to SW232. By storing the voltage, the second capacitors C21 to C232 can maintain a voltage of the output terminal as a stored voltage while the switching element SW21 to SW232 of the second switching unit 330 is turned off.

When the second switching unit 330 is turned on, a voltage corresponding to the level selection signal LSS can be output to the output terminal. According to a voltage level of the level selection signal LSS, a voltage level of the output signal OUT1 to OUT32 output to the output terminal can be determined. When the level selection signal LSS is applied in a high level, the output signal OUT1 to OUT32 in a high level can be output through the switching element SW11 to SW132 of the first switching unit 320 which are turned on and the switching element SW21 to SW232 of the second switching unit 330 which are turned on. In addition, when the level selection signal LSS is applied in a low level, the output signal OUT1 to OUT32 in a low level can be output through the switching element SW21 to SW232 of the first switching unit 320 which are turned on and the switching element SW21 to SW232 of the second switching unit 330 which are turned on. A voltage of the Q node and/or the QB node of the stage circuit ST1 to ST32 of the gate driver 20 corresponding thereto can be controlled in response to a voltage level of the output signal OUT1 to OUT32.

A method for operating the level shifting device 300 according to aspects of the present disclosure will be described in detail below.

Figure 15:
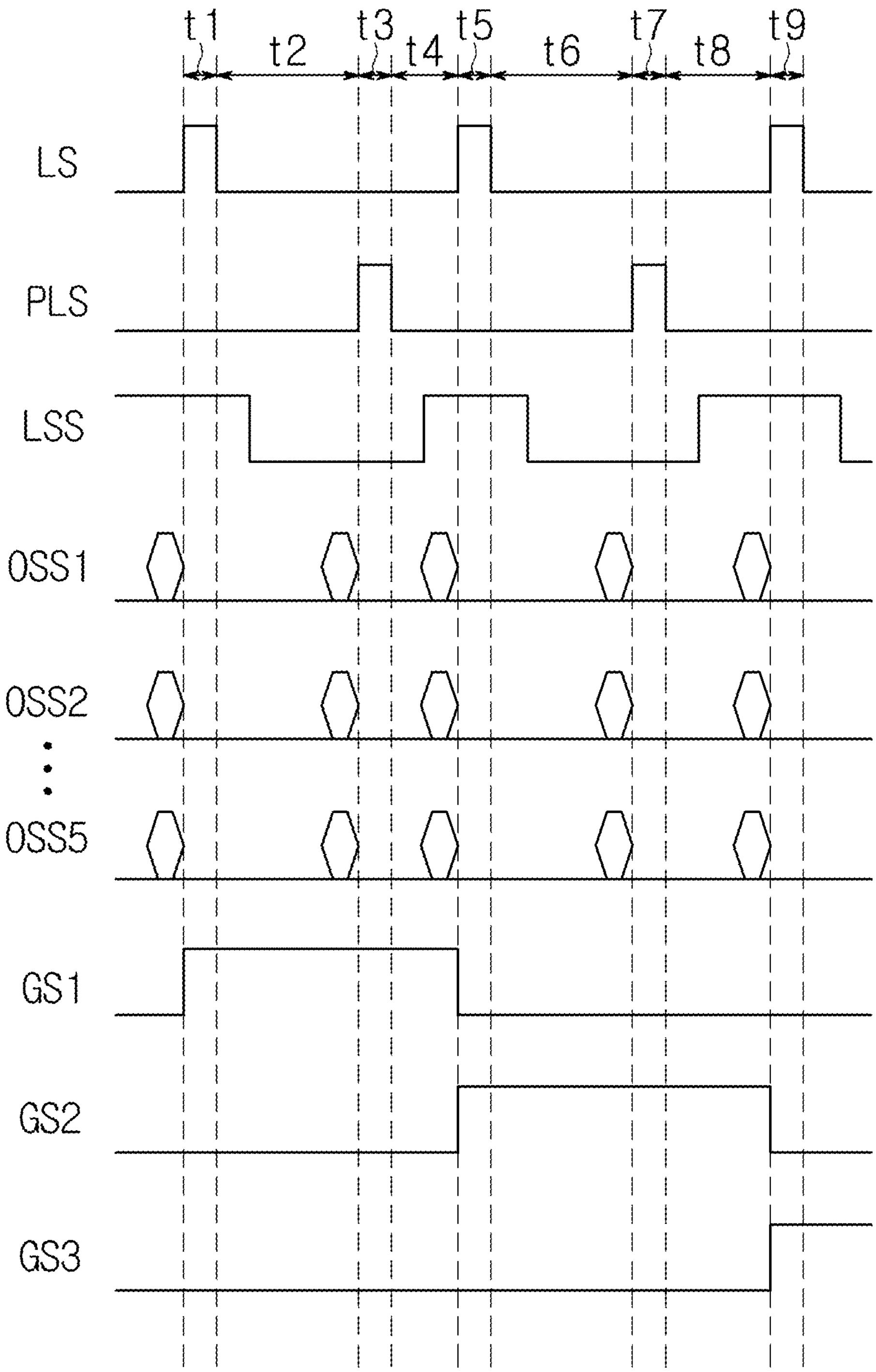
FIG. 15 is a diagram illustrating an input/output signal of the level shifting device in FIG. 14.

FIG. 15 is a diagram illustrating an input/output signal of the level shifting device illustrated in FIG. 14. FIGS. 16 to 24 are diagrams illustrating a method for operating the level shifting device illustrated in FIG. 14.

Referring to FIG. 15, before the first period t1, the switching element SW11 to SW132 of the first switching unit 320 are operated in a turn-off state as illustrated in FIG. 14. In addition, the switching element SW21 to SW232 of the second switching unit 330 are operated in a turn-off state in response to the latch signal LS in a turn-off level.

In an embodiment of the present disclosure, before the first period t1, the output selection signals OSS1 to OSS5 having a "00000" value can be input. In addition, before the first period t1, the level selection signal LSS can be input in a high level. The "00000" value can be converted into a switching signal SWS for turning on the first switching element SW11. At this instance, the second to thirty second switching elements SW12 to SW132 can be turned off.

Figure 16:
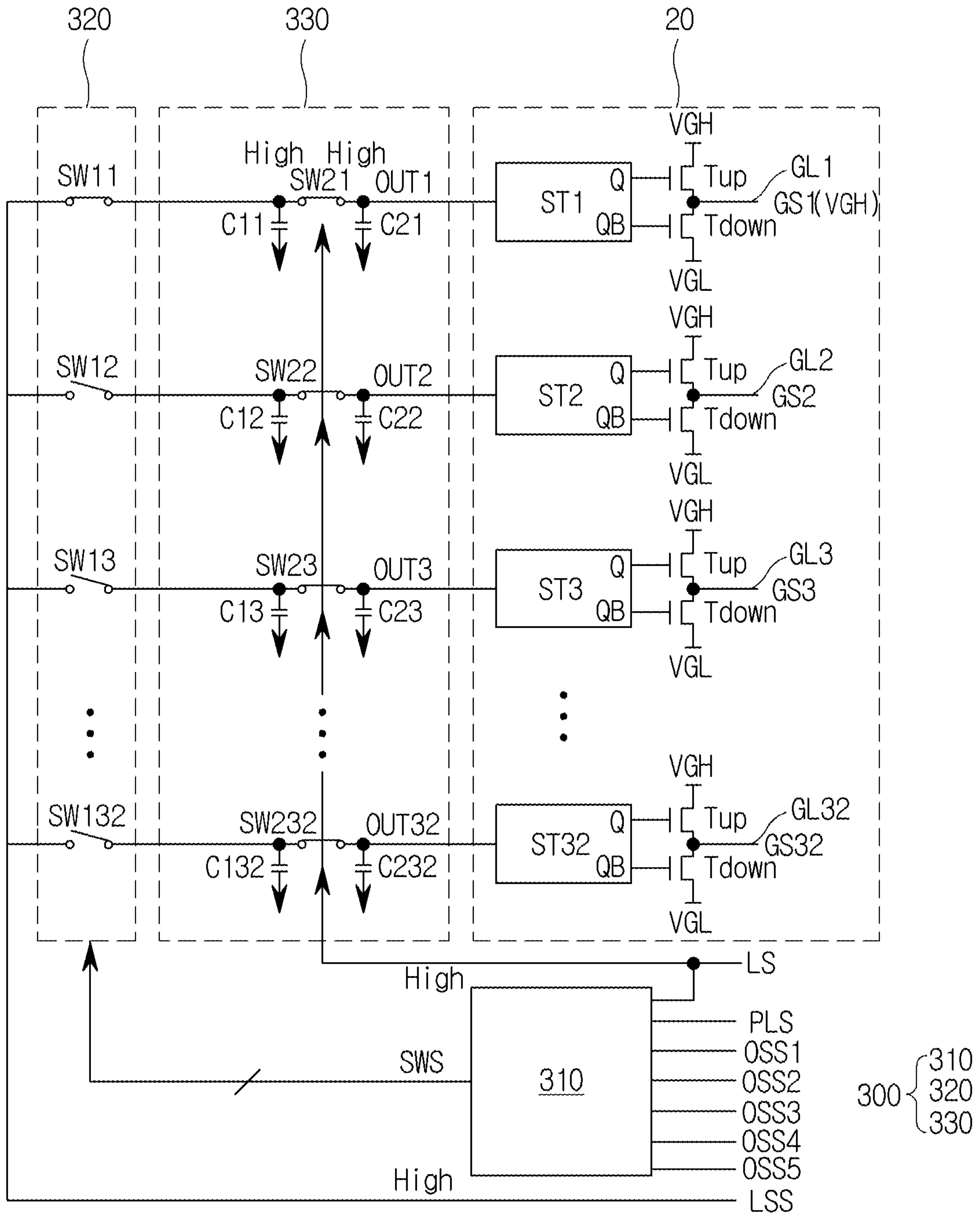
FIGS. 16 to 24 are diagrams illustrating a method for operating the level shifting device in FIG. 14 according to the second embodiment of the present disclosure.

Referring to FIG. 16, the latch signal LS can be applied in a turn-on level in the first period t1. Then, the switching element SW21 to SW232 of the second switching unit 330 can be turned on in response to the latch signal LS.

The controller 310 can output the switching signal SWS in response to the latch signal LS in a turn-on level. The controller 310 can apply the switching signal SWS in a turn-on level to the first switching element SW11 of the first switching unit 320 in response to the output selection signals OSS1 to OSS5. Then, the first switching element SW11 of the first switching unit 220 is turned on, and the level selection signal LSS in a high level can be applied to the second switching unit 330.

In the first period t1, the controller 310 can apply the switching signal SWS in a turn-off level to the second to thirty second switching elements SW12 to SW132 of the first switching unit 320.

The level selection signal LSS output from the first switching unit 320 can be further applied to the first stage circuit ST1 of the gate driver 20 through the first switching element SW21 of the second switching unit 330 which is turned on. The node voltage of the first stage circuit ST1 is controlled according to the level selection signal LSS in a high level, and a voltage level of a first gate signal GS1 output from the first stage circuit ST1 can be transitioned. For example, the first stage circuit ST1 can output the first gate signal GS1 in a turn-on level, for example, a high level. In the first period t1, the second to thirty second stage circuits ST2 to ST32 can output the gate signals GS2 to GS32 in a previous state, for example, the gate signals GS2 to GS32 in a turn-off level, which is a low level.

In an embodiment of the present disclosure, in the first period t1, a voltage in a high level corresponding to the level selection signal LSS can be stored in the first capacitor C11 and the second capacitor C21 connected to the first switching element SW21 of the second switching unit 330. In addition, in the first period t1, a low level voltage can be stored in the first capacitors C12 to C132 to the second capacitors C22 to C232 connected to the second to thirty second switching elements SW22 to SW232, respectively.

Figure 17:
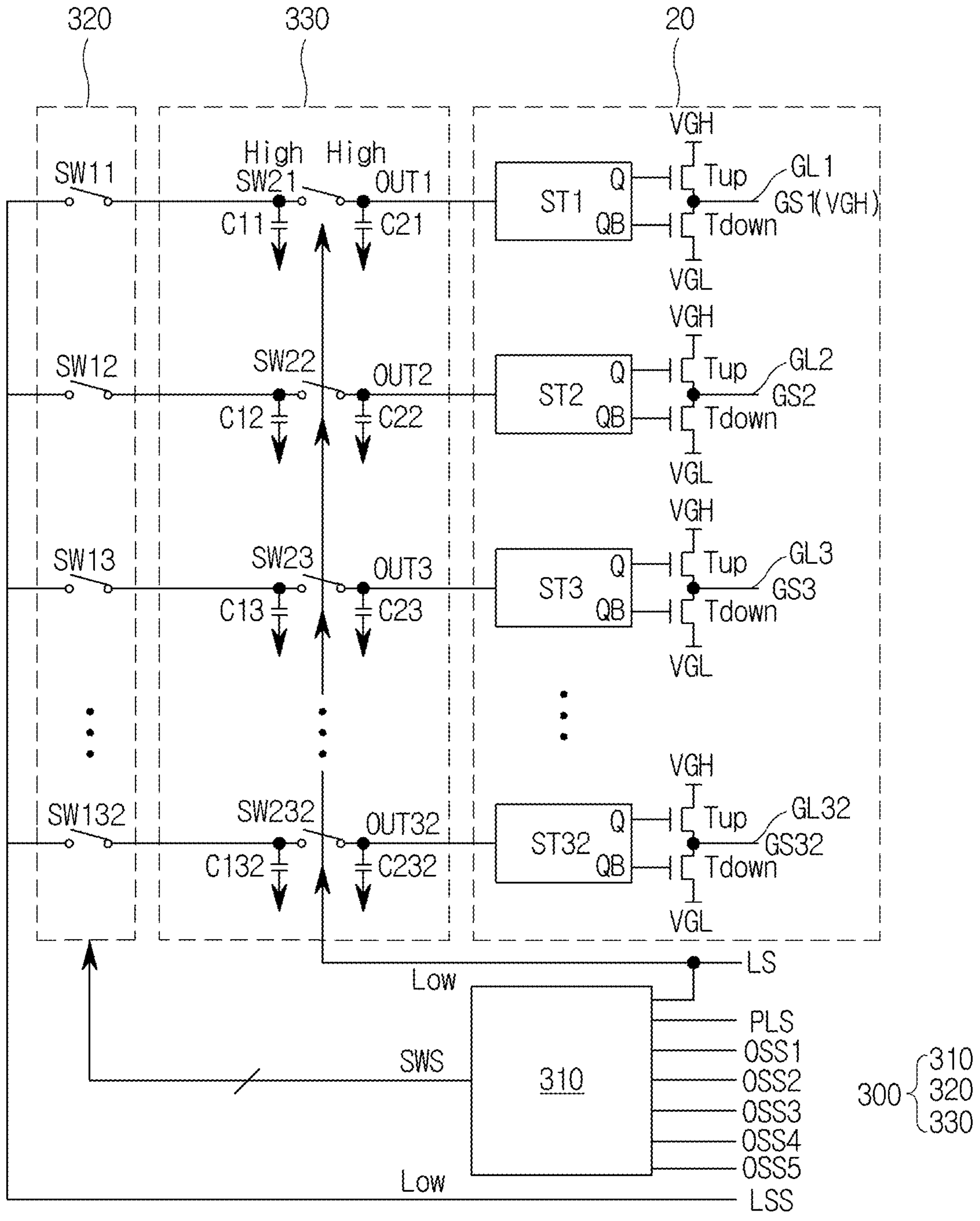

Referring to FIG. 17, in the second period t2, the latch signal LS can be applied in a turn-off level. Then, the switching elements SW21 to SW232 of the second switching unit 330 can be turned off in response to the latch signal LS.

The controller 310 can apply the switching signal SWS in a turn-off level to the first switching element SW11 of the first switching unit 320 in response to the latch signal LS which is turned off, and the first switching element SW11 of the first switching unit 320 can be turned off.

In the second period t2, both the first switching unit 320 and the second switching unit 330 are turned off, however, the voltage of the output terminal can be maintained stably in a previously set level by the voltage (for example, a high level voltage) stored in the first capacitor C11 to C132 and the second capacitor C21 to C232. Therefore, in the second period t2, the first gate signal GS1 output from the first stage circuit ST1 can be stably maintained in a high level.

Meanwhile, in the second period t2, the output selection signals OSS1 to OSS5 having the "00000" value can be input again and the level selection signal LSS can be transitioned into a low level.

Figure 18:
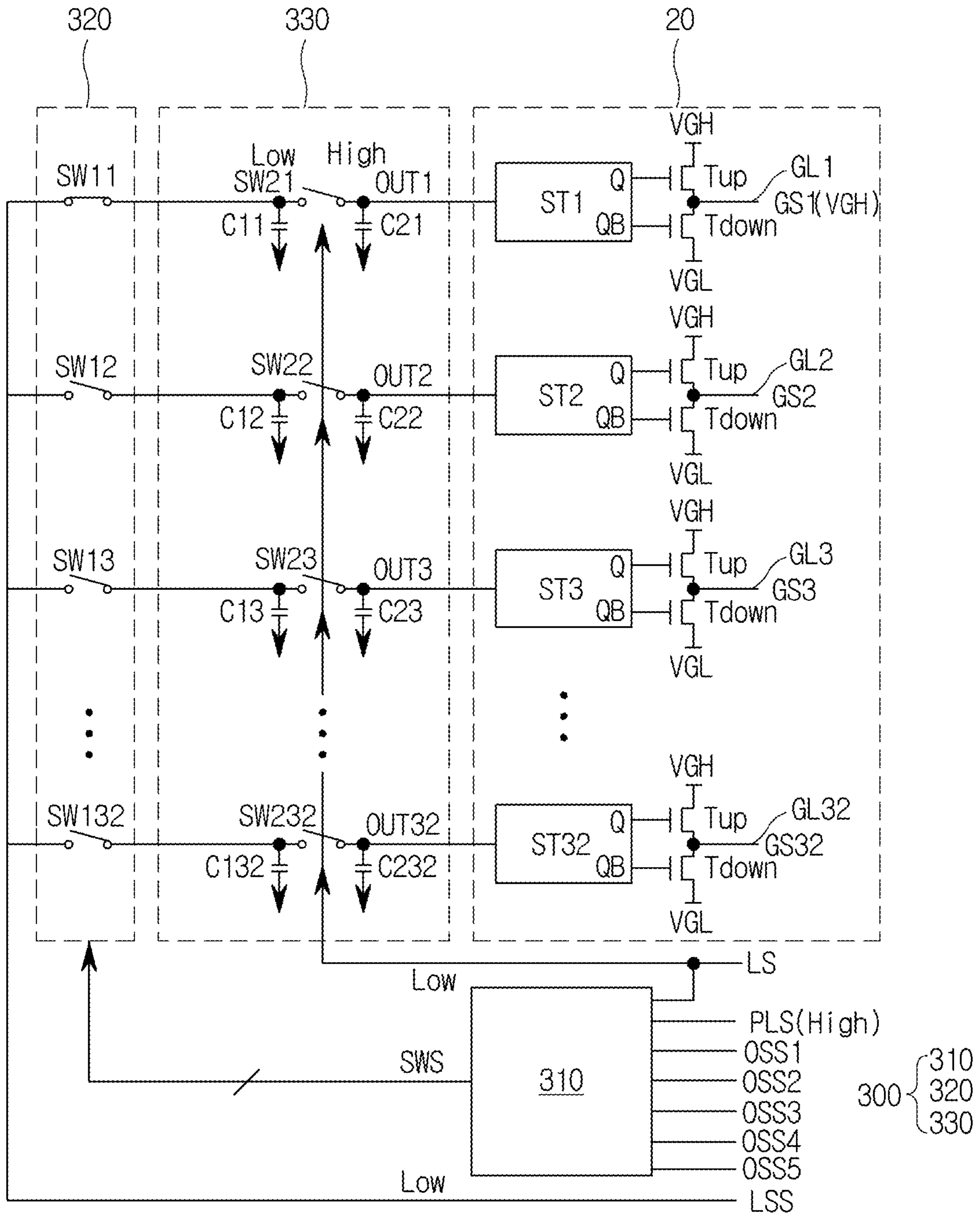

Referring to FIG. 18, in the third period t3, the pre-latch signal PLS can be applied in a turn-on level.

The controller 310 can output the switching signal SWS of which the "00000" value of the output selection signals OSS1 to OSS5 is converted in response to the pre-latch signal PLS in a turn-on level. Accordingly, the first switching element SW11 of the first switching unit 320 can be turned on. Then, as the first switching element SW11 of the first switching unit 320 is turned on, the level selection signal LSS in a low level can be applied to the second switching unit 330.

In the third period t3, the first switching element SW21 of the second switching unit 330 is in a turn-off state, therefore, the level selection signal LSS in a low level is not delivered to the output terminal. Instead, a low level voltage corresponding to the level selection signal LSS can be stored in the first capacitor C11 connected to the first switching element SW21. The second to thirty second switching elements SW12 to SW132 of the first switching unit 320 maintain the turn-off state, therefore, the second to thirty second output signals OUT2 to OUT32 can maintain a low level.

Figure 19:
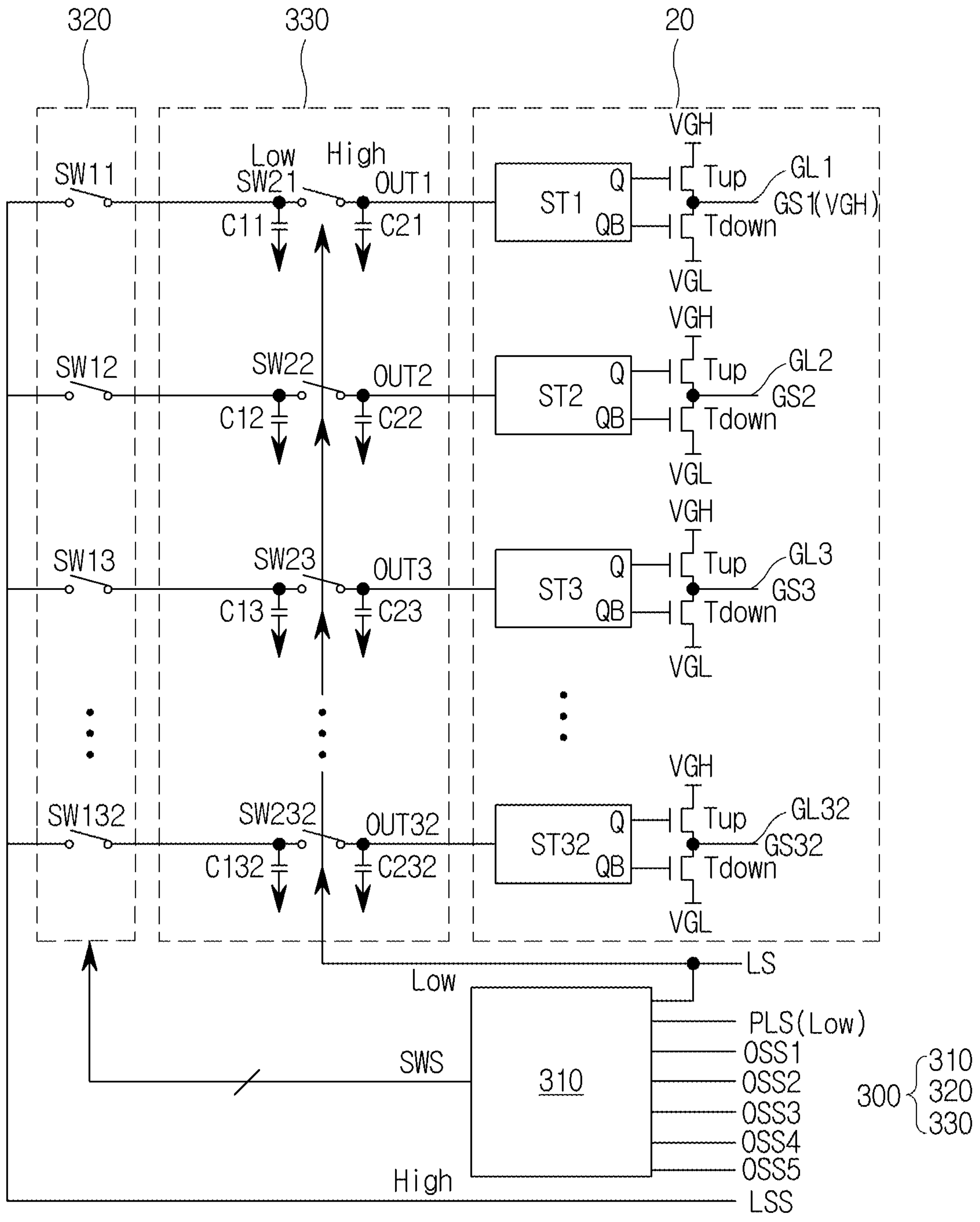

Referring to FIG. 19, in the fourth period t4, the pre-latch signal PLS can be applied in a turn-off level. In response to the pre-latch signal PLS which is turned off, the controller 310 can apply the switching signal SWS in a turn-off level to the first switching element SW11 of the first switching unit 320.

In the fourth period t4, the output selection signals OSS1 to OSS5 having a "00001" value can be input and the level selection signal LSS can be transitioned into a high level.

Figure 20:
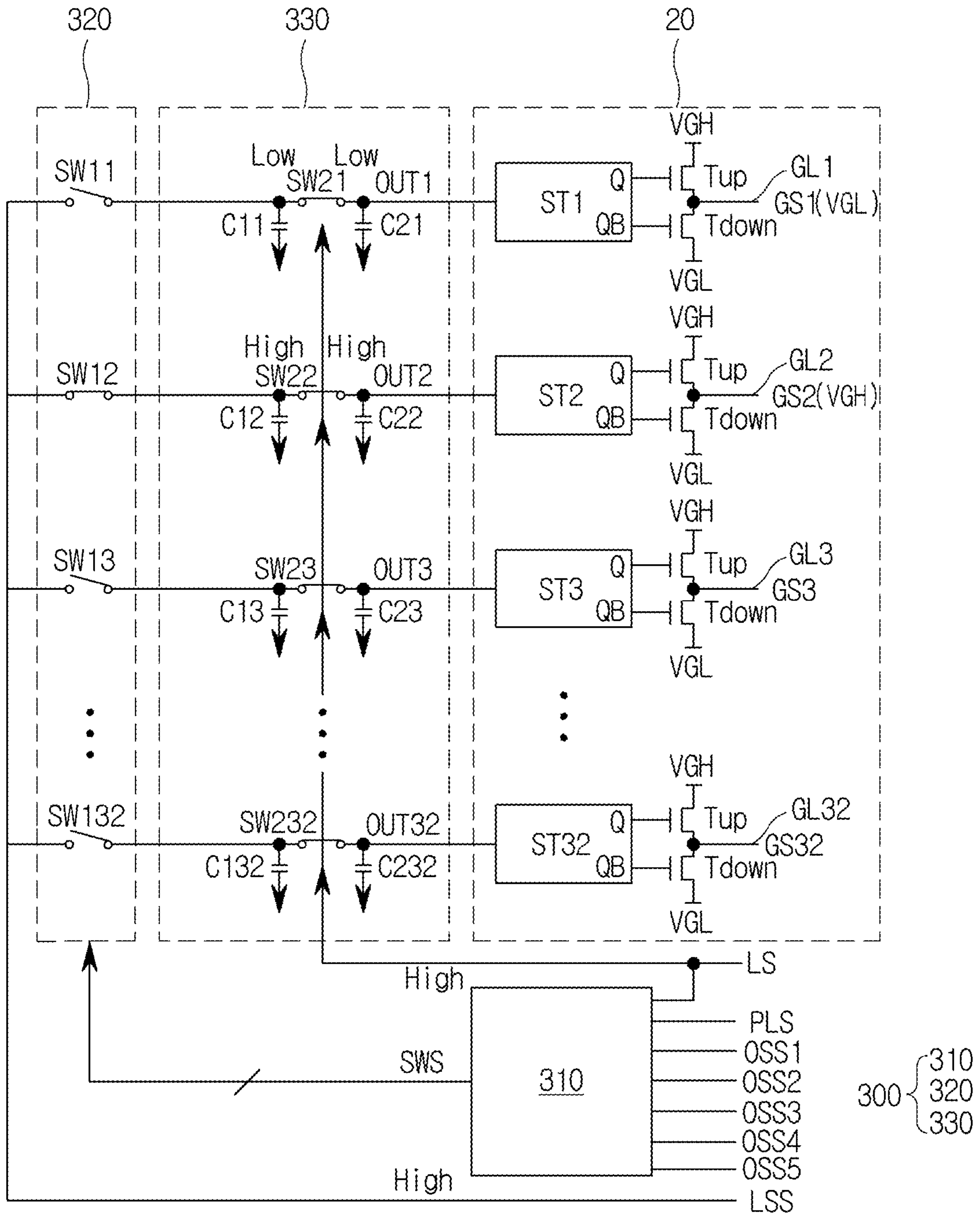

Referring to FIG. 20, in the fifth period t5, the latch signal LS can be applied in a turn-on level. Then, in response to the latch signal LS, the switching elements SW21 to SW232 of the second switching unit 330 can be turned on.

When the switching elements SW21 to SW232 of the second switching unit 330 are turned on, the first capacitors C11 to C132 and the second capacitors C21 to C232 are electrically connected. Accordingly, a voltage of the first capacitor C11 charged to a low level in the third period t3 can be delivered to the output terminal through the first switching element SW21. As a result, in the fifth period t5, the first gate signal GS1 output from the first stage circuit ST1 can be transitioned into a low level.

The controller 310 can output the switching signal SWS in response to the latch signal LS in a turn-on level. In response to the output selection signals OSS1 to OSS5, the controller 310 can apply the switching signal SWS in a turn-on level to the second switching element SW12 of the first switching unit 320. Then, as the second switching element SW12 of the first switching unit 320 is turned on, the level selection signal LSS in a high level can be applied to the second switching unit 330.

The level selection signal LSS output from the first switching unit 320 can be further applied to the second stage circuit ST2 of the gate driver 20 through the second switching element SW22 of the second switching unit 330 which is turned on. The node voltage of the second stage circuit ST2 is controlled according to the level selection signal LSS in a high level, and the voltage level of the second gate signal GS2 output from the second stage circuit ST2 can be transitioned. For example, the second stage circuit ST2 can output the first gate signal GS1 in a turn-on level, for example, a high level.

Meanwhile, in the fifth period t5, a high level voltage corresponding to the level selection signal LSS can be stored in the first capacitor C12 and the second capacitor C22 connected to the second switching element SW22 of the second switching unit 330.

In this embodiment, the first gate signal GS1 is transitioned into a turn-off level and at the same time, the second gate signal GS2 is transitioned into a turn-on level. For example, there is no time delay, or the time delay is minimized in the first gate signal GS1 and the second gate signal GS2. Through this configuration, the gate driver 20 can generate and output gate signals GS1 to GS32 of which a rising edge and a falling edge are synchronized with each other and which are output sequentially.

Figure 21:
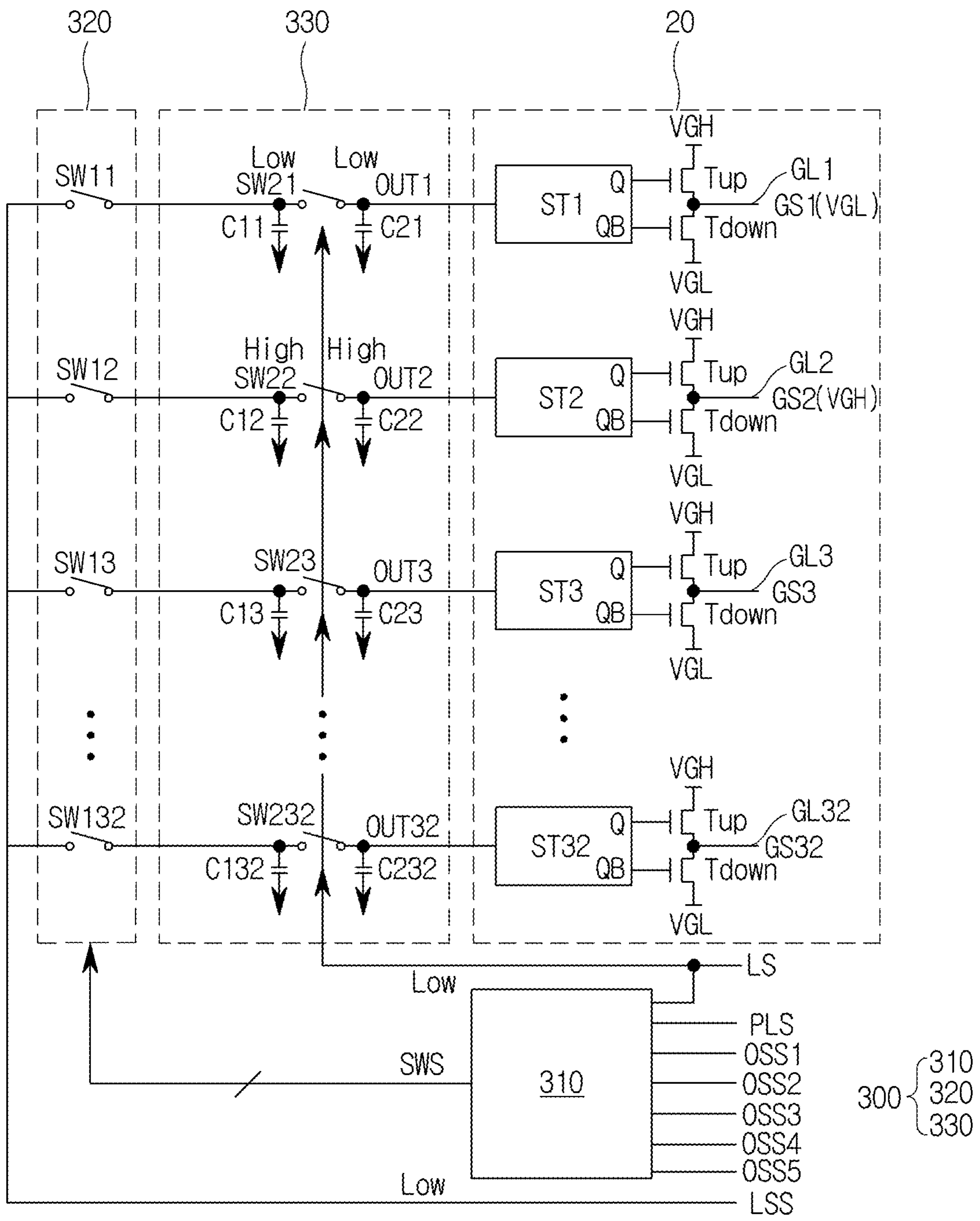

Referring to FIG. 21, in the sixth period t6, the latch signal LS can be applied in a turn-off level. Then, the switching elements SW21 to SW232 of the second switching unit 330 can be turned off in response to the latch signal LS.

The controller 310 can apply the switching signal SWS in a turn-off level to the second switching element SW12 of the first switching unit 320 in response to the latch signal LS which is turned off, and the second switching element SW12 of the first switching unit 320 can be turned off.

In the sixth period t6, both the first switching unit 220 and the second switching unit 230 are turned off, however, the voltage of the output terminal can be maintained stably in a previously set level by the voltage stored in the first capacitor C11 to C132 and the second capacitor C21 to C232. Therefore, in the sixth period t6, the second gate signal GS2 output from the second stage circuit ST2 can be maintained in a high level.

In the sixth period t6, the output selection signals OSS1 to OSS5 having a "00001" value can be input and the level selection signal LSS can be transitioned into a low level.

Figure 22:
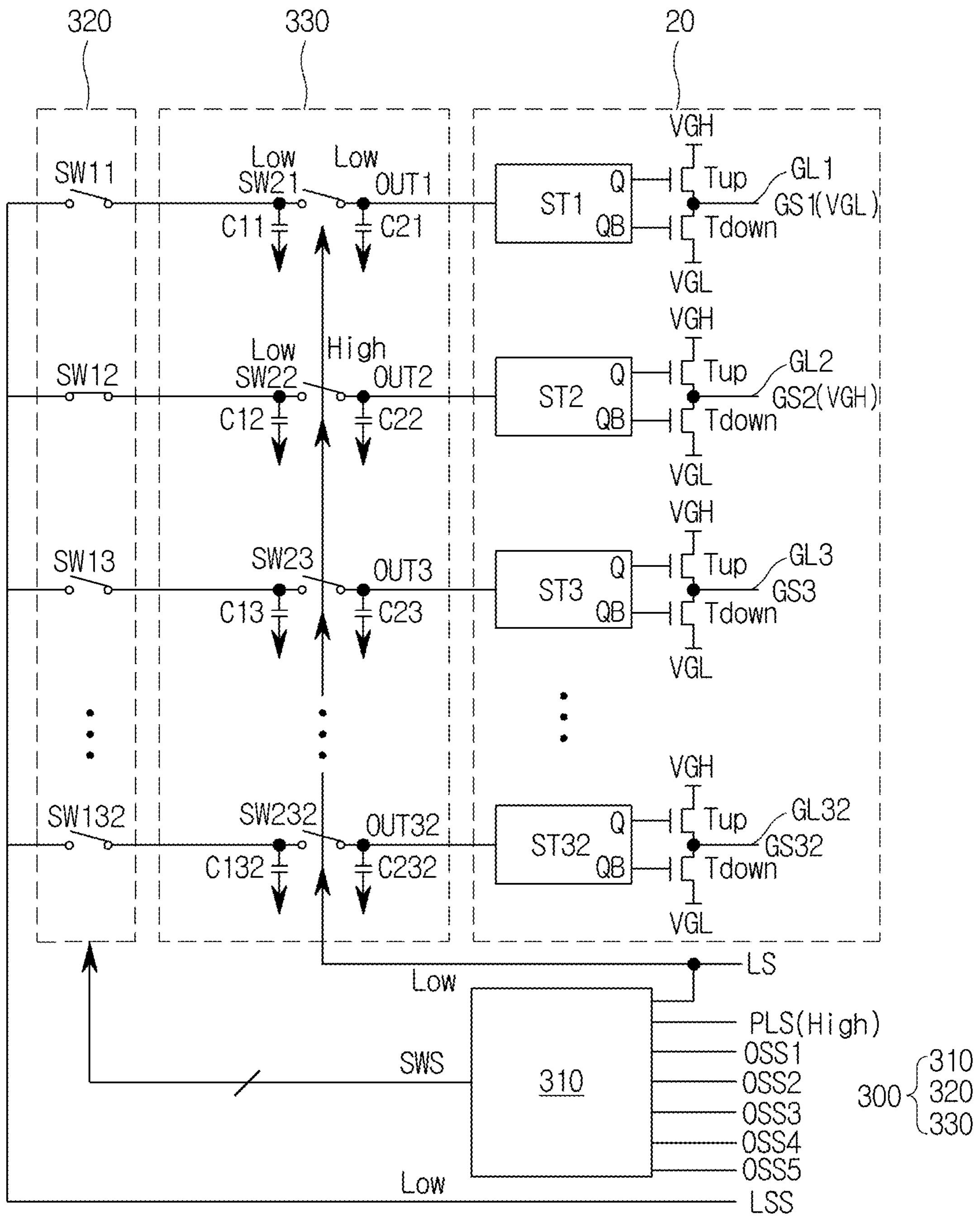

Referring to FIG. 22, in the seventh period t7, the pre-latch signal PLS can be applied in a turn-on level.

The controller 310 can output the switching signal SWS in response to the pre-latch signal PLS in a turn-on level. In response to the output selection signals OSS1 to OSS5, the controller 310 can apply the switching signal SWS in a turn-on level to the second switching element SW12 of the first switching unit 320. Then, as the first switching element SW12 of the first switching unit 320 is turned on, the level selection signal LSS in a low level can be applied to the second switching unit 330.

In the seventh period t7, the first switching element SW21 of the second switching unit 330 is in a turn-off state, therefore, the level selection signal LSS in a low level is not delivered to the output terminal. Instead, a low level voltage corresponding to the level selection signal LSS can be stored in the first capacitor C12 connected to the second switching element SW22.

Figure 23:
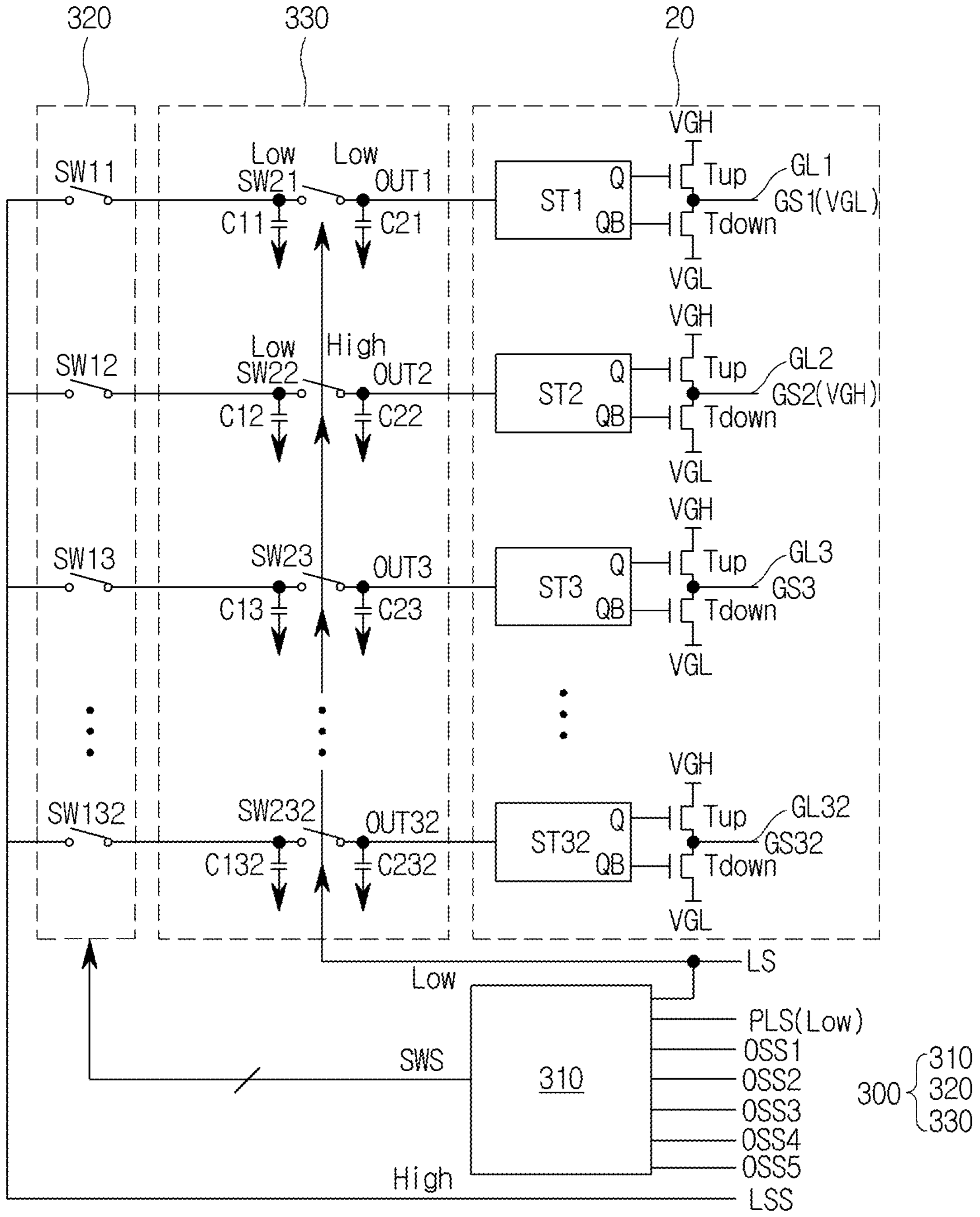

Referring to FIG. 23, in an eighth period t8, the pre-latch signal PLS can be applied in a turn-off level. The controller 310 can apply the switching signal SWS in a turn-off level to the second switching element SW12 of the first switching unit 320 in response to the latch signal LS which is turned off.

In the eighth period t8, the output selection signals OSS1 to OSS5 having a "00010" value can be input and the level selection signal LSS can be transitioned into a high level.

Figure 24:
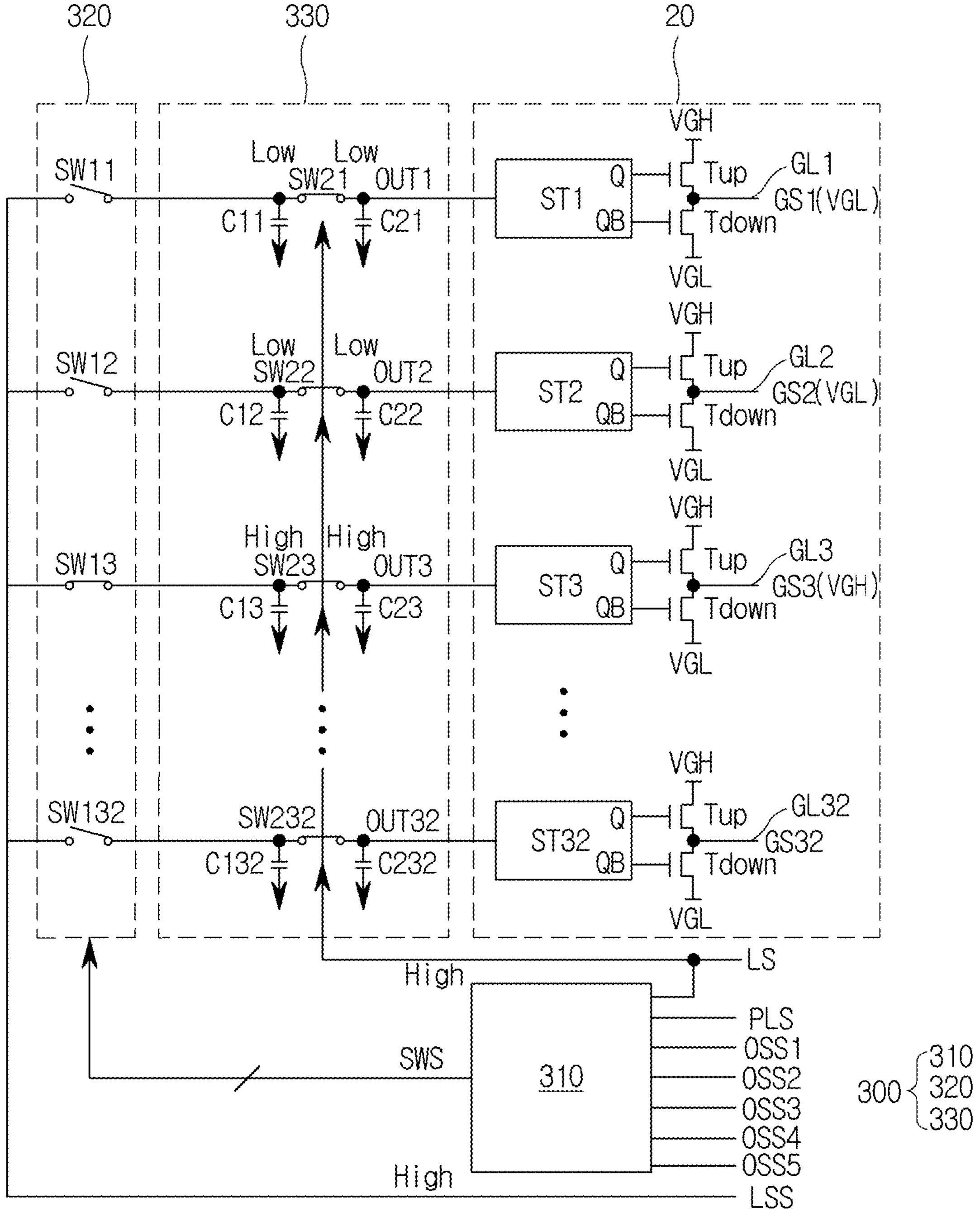

Referring to FIG. 24, in the ninth period t9, the latch signal LS can be applied in a turn-on level. Then, in response to the latch signal LS, the switching elements SW21 to SW232 of the second switching unit 330 can be turned on.

When the switching elements SW21 to SW232 of the second switching unit 330 are turned on, the first capacitors C11 to C132 and the second capacitors C21 to C232 are electrically connected. Accordingly, a voltage of the first capacitor C11 charged to a low level in the seventh period t7 can be delivered to the output terminal through the first switching element SW21. As a result, in the ninth period t9, the first gate signal GS1 output from the second stage circuit ST2 can be transitioned into a low level.

The level shifting device 300 can output the output signals OUT1 to OUT32 in a high level sequentially in the above-described manner. The gate driver 20 can output the gate signals GS1 to GS32 which are sequentially turned on to the gate lines GL1 to GL32 in response to the output signals OUT1 to OUT32 sequentially transitioned.

Those of ordinary skill in the art will recognize that the present disclosure can be embodied in other specific forms without departing from its spirit or essential characteristics. The described embodiments of the present disclosure are to be considered in all respects only as illustrative and not restrictive. The scope of the present disclosure is therefore indicated by the appended claims rather than by the foregoing description. All changes which come within meaning and range of equivalency of the claims are to be embraced within the scope of the present disclosure.

What is claimed is:

1. A level shifting device, comprising:
- a controller configured to output a switching signal based on a plurality of output selection signals input in parallel through each corresponding input pin;
- a first switching unit including a plurality of first switching elements connected between an input terminal and output terminals of a level selection signal, respectively, and configured to be turned on in response to the switching signal; and
- a second switching unit including a plurality of second switching elements connected between the plurality of first switching elements and the output terminals thereof, respectively, and configured to be turned on in response to a latch signal,
- wherein the controller outputs the switching signal in a turn-on level to one of the plurality of first switching elements based on the plurality of output selection signals, and
- wherein the plurality of first switching elements are turned on according to the switching signal, and are configured to output the level selection signal to a corresponding output terminal.

2. The level shifting device of claim 1,
- wherein the plurality of output selection signals instruct each bit of a binary code which includes information with respect to an output signal of which a voltage level is to be transitioned among a plurality of output signals.

3. The level shifting device of claim 1,
- wherein the second switching unit further includes:
- first capacitors connected between one end of the plurality of second switching elements and a ground voltage, respectively; and
- second capacitors connected between another end of the plurality of second switching elements and the ground voltage, respectively.

4. The level shifting device of claim 3,
- wherein the controller further receives the latch signal, and outputs the switching signal to a first switching element selected by the plurality of output selection signals among the plurality of first switching elements in response to the latch signal in a turn-on level.

5. The level shifting device of claim 4,
- wherein each of the plurality of second switching elements outputs the level selection signal input through the first switching element corresponding thereto to a corresponding output terminal in response to the latch signal in the turn-on level.

6. The level shifting device of claim 5,
- wherein the first capacitors or the second capacitors store a voltage corresponding to the level selection signal when the first switching element corresponding thereto or the second switching element corresponding thereto is turned on.

7. The level shifting device of claim 6,
- wherein a signal corresponding to the voltage stored in the second capacitors is output to the output terminals when the plurality of second switching elements are turned off.

8. The level shifting device of claim 4,
- wherein the controller further receives a pre-latch signal, and outputs the switching signal to a first switching element selected by the plurality of output selection signals among the plurality of first switching elements when the pre-latch signal is in a turn-on level.

9. The level shifting device of claim 8,
- wherein the first capacitors store a voltage corresponding to the level selection signal when the plurality of first switching elements are turned on in response to the pre-latch signal while the latch signal is applied in a turn-off level.

10. The level shifting device of claim 9,
- wherein a signal corresponding to the voltage stored in the first capacitors is output to a corresponding output terminal through the plurality of second switching elements when the latch signal is applied in a turn-on level.

11. A display device, comprising:
- a display panel having an arrangement of pixels;
- a timing controller configured to control an operation timing of the display panel;
- a level shifting device configured to generate output signals based on a gate driving control signal applied from the timing controller and output the output signals to a corresponding output terminal among output terminals of the level shifting device; and
- a gate driver including a plurality of stage circuits connected to the output terminals of the level shifting device, respectively, and configured to apply a gate signal to the pixels in response to the output signals, wherein the timing controller is configured to generate a plurality of output selection signals by encoding information with respect to an output signal of which a voltage level is to be transitioned among the output signals in a binary code, and wherein the level shifting device includes:

a controller configured to receive the plurality of output selection signals in parallel through each corresponding input pin, to generate the output signals based on the plurality of output selection signals, and to output a switching signal based on the plurality of output selection signals;

a first switching unit including a plurality of first switching elements connected between an input terminal and output terminals of a level selection signal, respectively, and configured to be turned on in response to the switching signal; and a second switching unit including a plurality of second switching elements connected between the plurality of first switching elements and the output terminals thereof, respectively, and configured to be turned on in response to a latch signal.

12. The display device of claim 11, wherein the second switching unit further includes:

first capacitors connected between one end of the plurality of second switching elements and a ground voltage, respectively; and second capacitors connected between another end of the plurality of second switching elements and the ground voltage, respectively.

13. The display device of claim 12, wherein the controller of the level shifting device further receives the latch signal, and outputs the switching signal to one of the plurality of first switching elements in response to the latch signal in a turn-on level.

14. The display device of claim 13, wherein each of the plurality of second switching elements outputs the level selection signal input through the first switching element corresponding thereto to a corresponding output terminal in response to the latch signal in the turn-on level.

15. The display device of claim 14, wherein the first capacitors or the second capacitors store a voltage corresponding to the level selection signal when the first switching element corresponding thereto or the second switching element corresponding thereto is turned on.

16. The display device of claim 15, wherein a signal corresponding to the voltage stored in the second capacitors is output to the output terminals when the plurality of second switching elements are turned off.

17. The display device of claim 13, wherein the controller of the level shifting device further receives a pre-latch signal, and outputs the switching signal to a first switching element selected by the plurality of output selection signals among the plurality of first switching elements when the pre-latch signal is in a turn-on level.

18. The display device of claim 17, wherein the first capacitors store a voltage corresponding to the level selection signal when the plurality of first switching elements are turned on in response to the pre-latch signal while the latch signal is applied in a turn-off level, and wherein a signal corresponding to the voltage stored in the first capacitors is output to a corresponding output terminal through the plurality of second switching elements when the latch signal is applied in a turn-on level.

* * * * *